US012586203B2

(12) United States Patent
Tang et al.

(10) Patent No.: US 12,586,203 B2
(45) Date of Patent: Mar. 24, 2026

(54) IMAGE CUTTING METHOD AND APPARATUS, COMPUTER DEVICE, AND STORAGE MEDIUM

(71) Applicant: Tencent Technology (Shenzhen) Company Limited, Shenzhen (CN)

(72) Inventors: Zesheng Tang, Shenzhen (CN); Jianfeng Si, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 301 days.

(21) Appl. No.: 18/219,943

(22) Filed: Jul. 10, 2023

(65) Prior Publication Data

US 2023/0351604 A1 Nov. 2, 2023

Related U.S. Application Data

(63) Continuation of application No. PCT/CN2022/113325, filed on Aug. 18, 2022.

(30) Foreign Application Priority Data

Sep. 27, 2021 (CN) .......................... 202111137663.4

(51) Int. Cl.
*G06T 7/11* (2017.01)
*G06T 7/246* (2017.01)
*G06V 40/16* (2022.01)

(52) U.S. Cl.
CPC ................ *G06T 7/11* (2017.01); *G06T 7/246* (2017.01); *G06V 40/165* (2022.01);
(Continued)

(58) Field of Classification Search
CPC . G06T 7/11; G06T 7/246; G06T 2207/10016; G06T 2207/30201;
(Continued)

(56) References Cited

U.S. PATENT DOCUMENTS 10,205,835 B1 2/2019 Zizzo et al.
2009/0060394 A1* 3/2009 Yamazaki ............ G06V 10/242
382/311

(Continued)

FOREIGN PATENT DOCUMENTS

CN 101833859 A 9/2010
CN 104504649 A 4/2015
(Continued)

OTHER PUBLICATIONS

Tencent Technology, ISR, PCT/CN2022/113325, Nov. 1, 2022, 3 pgs.
(Continued)

*Primary Examiner* — Kathleen M Broughton
(74) *Attorney, Agent, or Firm* — Morgan, Lewis & Bockius LLP

(57) ABSTRACT
The present disclosure provides an image cutting method performed by a computer device. The method includes: determining an object frame in which an object in a first image belonging to a first type is located as a first target frame and determining an object frame in which an object in
(Continued)

the first image belonging to a second type is located as an exclusion frame; determining a target area in the first image, the target area comprising the first target frame and not comprising the exclusion frame; and cutting the first image based on the target area to obtain a second image comprising the first target frame and not comprising the exclusion frame. Using the above method, apparatus, computer device, and storage medium, the image cutting effect and the image cutting speed can be improved.

17 Claims, 12 Drawing Sheets

(52) U.S. Cl.
CPC ............... *G06T 2207/10016* (2013.01); *G06T 2207/30201* (2013.01); *G06V 2201/07* (2022.01)

(58) Field of Classification Search
CPC . G06T 2207/20132; G06T 2207/30176; G06T 2207/30204; G06T 11/60; G06T 7/12; G06T 7/13; G06V 40/165; G06V 2201/07; G06V 20/20; G06V 40/11; G06V 40/28
See application file for complete search history.

(56) References Cited

U.S. PATENT DOCUMENTS

| | | | | |
|---|---|---|---|---|
| 2010/0329550 | A1 | 12/2010 | Cheatle | |
| 2019/0057276 | A1* | 2/2019 | Tatsumi | ............. G06V 30/1448 |
| 2019/0164010 | A1* | 5/2019 | Ma | ......................... G06F 18/254 |
| 2020/0394411 | A1* | 12/2020 | Dahlberg | ............... G06V 40/10 |
| 2023/0206591 | A1* | 6/2023 | Wu | ............... H04N 21/440245 |

FOREIGN PATENT DOCUMENTS

| | | | | | |
|---|---|---|---|---|---|
| CN | 108122239 | A | | 6/2018 | |
| CN | 110349082 | A | | 10/2019 | |
| CN | 110399848 | A | | 11/2019 | |
| CN | 110706150 | A | | 1/2020 | |
| CN | 111886609 | A | | 11/2020 | |
| CN | 111901679 | A | * | 11/2020 | ....... H04N 21/44008 |
| CN | 112036345 | A | | 12/2020 | |
| CN | 112749690 | A | | 5/2021 | |
| CN | 113570626 | A | | 10/2021 | |

OTHER PUBLICATIONS

Tencent Technology, WO, PCT/CN2022/113325, Nov. 1, 2022, 5 pgs.
Tencent Technology, IPRP, PCT/CN2022/113325, Apr. 2, 2034, 6 pgs.

* cited by examiner

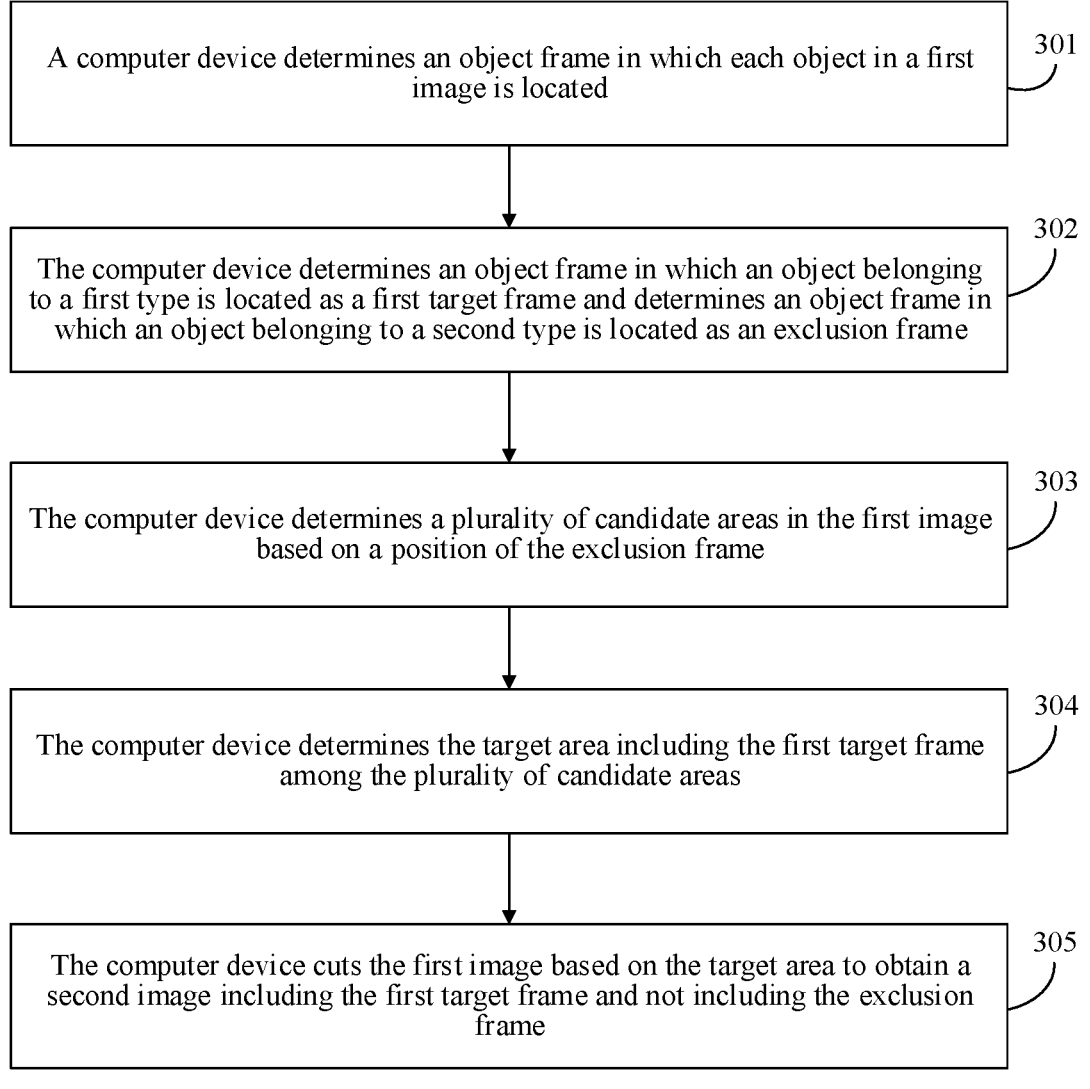

A computer device determines an object frame in which each object in a first image is located — 301

The computer device determines an object frame in which an object belonging to a first type is located as a first target frame and determines an object frame in which an object belonging to a second type is located as an exclusion frame — 302

The computer device determines a plurality of candidate areas in the first image based on a position of the exclusion frame — 303

The computer device determines the target area including the first target frame among the plurality of candidate areas — 304

The computer device cuts the first image based on the target area to obtain a second image including the first target frame and not including the exclusion frame — 305

FIG. 3

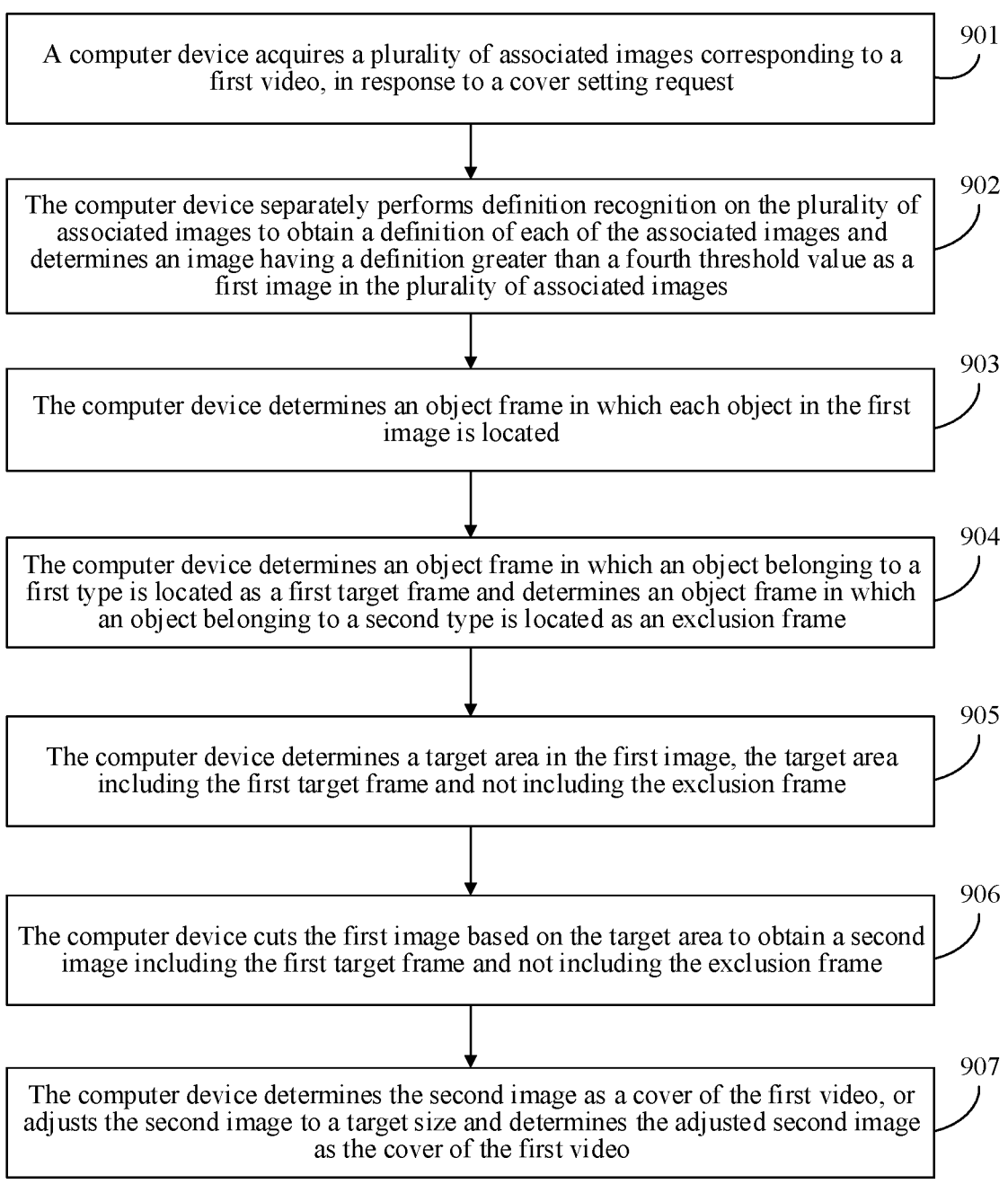

A computer device acquires a plurality of associated images corresponding to a first video, in response to a cover setting request — 901

The computer device separately performs definition recognition on the plurality of associated images to obtain a definition of each of the associated images and determines an image having a definition greater than a fourth threshold value as a first image in the plurality of associated images — 902

The computer device determines an object frame in which each object in the first image is located — 903

The computer device determines an object frame in which an object belonging to a first type is located as a first target frame and determines an object frame in which an object belonging to a second type is located as an exclusion frame — 904

The computer device determines a target area in the first image, the target area including the first target frame and not including the exclusion frame — 905

The computer device cuts the first image based on the target area to obtain a second image including the first target frame and not including the exclusion frame — 906

The computer device determines the second image as a cover of the first video, or adjusts the second image to a target size and determines the adjusted second image as the cover of the first video — 907

FIG. 9

IMAGE CUTTING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2022/113325, entitled "IMAGE CROPPING METHOD AND APPARATUS, AND COMPUTER DEVICE AND STORAGE MEDIUM" filed on Aug. 18, 2022, which claims priority to Chinese Patent Application No. 202111137663.4, entitled "IMAGE CUTTING METHOD AND APPARATUS, COMPUTER DEVICE, AND STORAGE MEDIUM", filed on Sep. 27, 2021, the content of which is incorporated herein by reference in its entirety.

FIELD OF THE TECHNOLOGY

The embodiments of this application relate to the field of computer technologies, and in particular, to an image cutting method and apparatus, a computer device, and a storage medium.

BACKGROUND OF THE DISCLOSURE

With the rapid growth of computer technologies, there is an increasing demand for image cutting in various fields. In the related art, a way of center cutting is generally used, namely, cutting an edge area in an image and reserving a central area of the image. However, the cut image may include incomplete key information or much interference information, and thus the image cutting effect is not good.

SUMMARY

The embodiments of this application provide an image cutting method and apparatus, a computer device, and a storage medium and can improve the image cutting efficiency. The technical solutions include the following aspects.

In an aspect, there is provided an image cutting method, performed by a computer device, the method including:

determining an object frame in which an object in a first image belonging to a first type is located as a first target frame and determining an object frame in which an object in the first image belonging to a second type is located as an exclusion frame;

determining a target area in the first image, the target area including the first target frame and not including the exclusion frame; and cutting the first image based on the target area to obtain a second image including the first target frame and not including the exclusion frame.

In another aspect, there is provided a computer device, including a processor and a memory, the memory being configured to store at least one computer program therein, and the at least one computer program being loaded and executed by the processor to cause the computer device to implement operations performed by the image cutting method as described in the above aspect.

In another aspect, there is provided a non-transitory computer-readable storage medium, configured to store at least one computer program therein, the at least one computer program being loaded and executed by a processor of a computer device to cause the computer device to implement operations performed by the image cutting method as described in the above aspect.

The method, apparatus, computer device, and storage medium provided in the embodiments of this application divide objects in a first image into objects needing to be reserved and objects not needing to be reserved, mark areas in which the objects needing to be reserved and the objects not needing to be reserved are located by determining a first target frame and an exclusion frame, and cut the first image based on a target area to obtain a second image including the first target frame and not including the exclusion frame since the target area in the first image includes the first target frame and does not include the exclusion frame. The first target frame and the exclusion frame are used to mark the areas in which the objects needing to be reserved and the objects not needing to be reserved are located in the image, facilitating rapid identification of the target area and improving the image cutting speed. In addition, the objects needing to be reserved can be considered as key information needing to be given attention, and the objects not needing to be reserved can be considered as interference information not needing to be given attention. Therefore, such image cutting method ensures that the second image includes the key information needing to be given attention and excludes the interference information not needing to be given attention, thus improving the image cutting effect.

BRIEF DESCRIPTION OF THE DRAWINGS

FIG. 3 is a flowchart of an image cutting method provided in an embodiment of this application.

FIG. 9 is a flowchart of an image cutting method provided in an embodiment of this application.

DESCRIPTION OF EMBODIMENTS

To make objectives, technical solutions, and advantages of the embodiments of this application clearer, the following further describes in detail implementations of this application with reference to the accompanying drawings.

It may be understood that the terms "first", "second", and the like used in this application may be used for describing various concepts in this specification. However, the concepts are not limited by the terms unless otherwise specified. The terms are merely used for distinguishing one concept from another concept. For example, a first video may be referred to as a second video, and similarly, a second video may be referred to as a first video, without departing from the scope of this application.

At least one refers to one or more. For example, at least one exclusion frame may be one exclusion frame, two exclusion frames, three exclusion frames, and any integer number of exclusion frames, where the number is greater than or equal to one. A plurality of refers to two or more. For example, a plurality of exclusion frames may be two exclusion frames, three exclusion frames, and any integer number of exclusion frames, where the number is greater than or equal to two. Each refers to each of at least one. For example, each exclusion frame refers to each exclusion frame of a plurality of exclusion frames. If the plurality of exclusion frames are 3 exclusion frames, each exclusion frame refers to each exclusion frame of the 3 exclusion frames.

Figure 1:
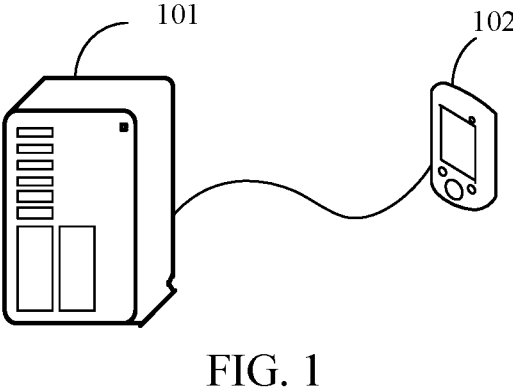
FIG. 1 is a schematic illustration of an implementation environment provided in an embodiment of this application.

FIG. 1 is a schematic diagram of an implementation environment provided in an embodiment of this application. With reference to FIG. 1, the implementation environment includes: a server 101 and a terminal 102. The server 101 is configured to cut an image and provide the cut image for the terminal 102. For example, the terminal 102 is configured to share a video and request the server 101 to set a cover for the video before sharing the video. The server 101 is configured to cut an image associated with the video so as to determine the cut image as the cover of the video and provide same for the terminal 102. In some embodiments, the terminal 102 may also be configured to cut an image. For example, the terminal 102 cuts an image associated with the video before sharing the video so as to determine the cut image as the cover of the video.

In a possible implementation, the server 101 is an independent physical server or a server cluster, or a distributed system of a plurality of physical servers, or a cloud server providing basic cloud computing services, such as cloud service, cloud database, cloud computing, cloud function, cloud storage, network service, cloud communication, middleware service, domain name service, security service, content delivery network (CDN), and big data and artificial intelligence platforms. The terminal 102 is, but not limited to, a smart phone, a tablet computer, a notebook computer, a desktop computer, a smart speaker, a smart watch, a smart television, a smart car terminal, and the like. The server 101 and the terminal 102 may be directly or indirectly connected via wired or wireless communication, and this application is not limited thereto.

In another possible implementation, a target application with services provided by the server 101 is installed on the terminal 102. Through the target application, the terminal 102 can perform functions such as video editing or video playing. In some embodiments, the target application is a target application in an operating system of the terminal 102 or a target application provided by a third party. For example, the target application is a video sharing application, and the video sharing application has a video sharing function. The video sharing application can also have other functions, such as comment, shopping, navigation, and game.

Figure 2:
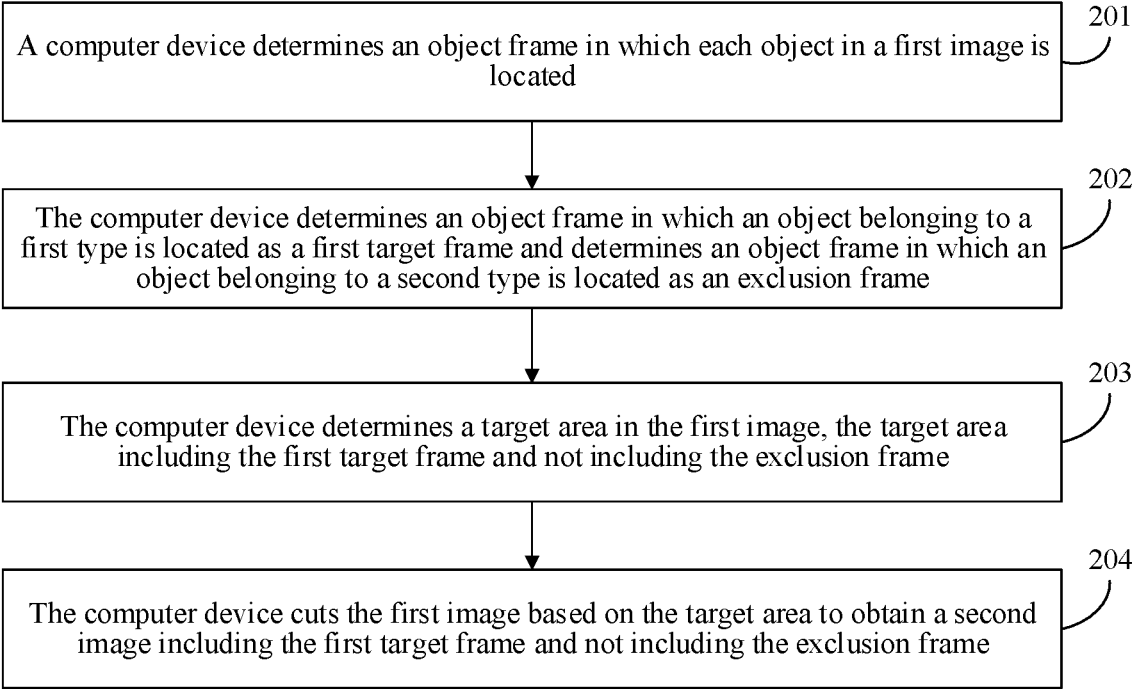
FIG. 2 is a flowchart of an image cutting method provided in an embodiment of this application.

FIG. 2 is a flowchart of an image cutting method provided in an embodiment of this application. The execution entity of an embodiment of this application is a computer device. With reference to FIG. 2, the method includes the following step 201 to step 204.

201: A computer device determines an object frame in which each object in a first image is located.

The computer device acquires the first image, and the first image is an image to be cut. The first image includes a plurality of objects. The objects may be any type of objects, such as figure, entity, text, or watermark. The computer device determines the object frame in which each object in the first image is located. The object frame is used for representing a position of the object, and an area framed by the object frame is an area in which the object is located.

202: The computer device determines an object frame in which an object belonging to a first type is located as a first target frame and determines an object frame in which an object belonging to a second type is located as an exclusion frame.

The plurality of objects in the first image includes the object belonging to the first type and the object belonging to the second type. The object belonging to the first type is an object needing to be reserved, i.e., an object needing to be reserved for cutting the first image. The object of the first type is key information needing to be given attention in the first image. The object belonging to the second type is an object not needing to be reserved, i.e., an object not needing to be reserved for cutting the first image. The object of the second type is interference information not needing to be given attention in the first image.

Therefore, the computer device determines the object frame in which the object belonging to the first type is located as the first target frame to indicate that an area framed by the first target frame is an area needing to be reserved. The computer device determines the object frame in which the object belonging to the second type is located as the exclusion frame to indicate that an area framed by the exclusion frame is an area not needing to be reserved. The computer device marks an area needing to be reserved and an area not needing to be reserved in the first image by determining the first target frame and the exclusion frame.

203: The computer device determines a target area in the first image, the target area including the first target frame and not including the exclusion frame.

After determining the first target frame and the exclusion frame in the first image, the computer device determines the target area including the first target frame and not including the exclusion frame in the first image based on the first target frame and the exclusion frame. The target area includes the object needing to be reserved and does not include the object not needing to be reserved. By determining such target area, the cutting of the first image can be facilitated, and the cut image includes the object needing to be reserved and does not include the object not needing to be reserved.

204: The computer device cuts the first image based on the target area to obtain a second image including the first target frame and not including the exclusion frame.

After determining the target area in the first image, the computer device cuts the first image based on the target area to obtain the second image including the first target frame since the target area includes the first target frame and does not include the exclusion frame. Since the cutting is performed on the basis of the target area, and the target area does not include the exclusion frame, the cut second image also does not include the exclusion frame.

The second image includes the area framed by the first target frame and does not include the area framed by the exclusion frame. Thus, the second image includes the object needing to be reserved and does not include the object not needing to be reserved.

In an exemplary embodiment, the number of at least one of the first target frames and the exclusion frames is multiple. That the second image includes the first target frame and does not include the exclusion frame means that the second image includes at least one of the first target frames and does not include any one of the exclusion frames.

This embodiment of this application is described by taking an example: the execution entity is the computer device. In a possible implementation, the computer device is a server in the implementation environment as shown in FIG. 1. In another possible implementation, the computer device is a terminal in the implementation environment as shown in FIG. 1.

The method provided in the embodiments of this application divides objects in a first image into objects needing to be reserved and objects not needing to be reserved, marks areas in which the objects needing to be reserved and the objects not needing to be reserved are located by determining a first target frame and an exclusion frame, and cuts the first image based on a target area to obtain a second image including the first target frame and not including the exclusion frame since the target area in the first image includes the first target frame and does not include the exclusion frame. The first target frame and the exclusion frame are used to mark the areas in which the objects needing to be reserved and the objects not needing to be reserved are located in the image, facilitating rapid identification of the target area and improving the image cutting speed. In addition, the objects needing to be reserved can be considered as key information needing to be given attention, and the objects not needing to be reserved can be considered as interference information not needing to be given attention. Therefore, such image cutting method ensures that the second image includes the key information needing to be given attention and excludes the interference information not needing to be given attention, thus improving the image cutting effect.

FIG. 3 is a flowchart of an image cutting method provided in an embodiment of this application. The execution entity of an embodiment of this application is a computer device. With reference to FIG. 3, the method includes the following step 301 to step 305.

301: A computer device determines an object frame in which each object in a first image is located.

The computer device acquires the first image to be cut, identifies a plurality of objects in the first image, and thus determines the object frame in which each object in the first image is located. The object frame is used for representing a position of the object, and an area framed by the object frame is an area in which the object is located. For example, the object frame is a rectangular frame or may be a frame of other shapes.

In a possible implementation, the determining, by the computer device, an object frame in which each object in a first image is located includes at least one of the following:

(1) Performing face recognition on the first image to obtain a face frame in the first image.

The face frame is an object frame in which a face is located, and an area framed by the face frame is an area in which the face is located. In some embodiments, the computer device stores a face recognition model and invokes the face recognition model to perform the face recognition on the first image to obtain the face frame in which the face is located in the first image.

(2) Performing entity recognition on the first image to obtain an entity frame in the first image.

The entity frame is an object frame in which an entity is located, and an area framed by the entity frame is an area in which the entity is located. In some embodiments, the computer device stores an entity recognition model and invokes the entity recognition model to perform the entity recognition on the first image to obtain the entity frame in which the entity is located in the first image. The entity recognition model is capable of recognizing various entities such as vehicle, tree, building, furniture, or animal.

(3) Performing text recognition on the first image to obtain a text frame in the first image.

The text frame is an object frame in which a text is located, and an area framed by the text frame is an area in which the text is located. In some embodiments, the computer device stores a text recognition model and invokes the text recognition model to perform the text recognition on the first image to obtain the text frame in which the text is located in the first image. For example, the first image is a video frame, and the text in the first image is a subtitle in the video frame.

(4) Performing watermark recognition on the first image to obtain a watermark frame in the first image.

The watermark frame is an object frame in which a watermark is located, and an area framed by the watermark frame is an area in which the watermark is located. In some embodiments, the computer device stores a watermark recognition model and invokes the watermark recognition model to perform the watermark recognition on the first image to obtain the watermark frame in which the watermark is located in the first image. For example, the watermark in the first image is a Logo and the like added to the first image.

Exemplarily, the structure of each of the above face recognition model, entity recognition model, text recognition model, and watermark recognition model may be any neural network model. The structures of different recognition models may be the same or different, which is not limited in the embodiments of this application. Exemplarily, the face recognition model, entity recognition model, text recognition model, and watermark recognition model may be obtained through supervised training. For example, according to a face image and a face frame annotation result in the face image, a face recognition model is obtained through supervised training; according to an entity image and an entity frame annotation result in the entity image, an entity recognition model is obtained through supervised training; according to a text image and a text frame annotation result in the text image, a text recognition model is obtained through supervised training; according to a watermark image and a watermark frame annotation result in the watermark image, a watermark recognition model is obtained through supervised training.

In another possible implementation, the computer device performs object recognition on the first image to obtain an object frame in which each object in a first image is located, and the computer device increases the size of the object frame by a third multiple, thus ensuring that the object in the object frame is complete and avoiding the case in which the object in the object frame is incomplete due to an incorrect recognition result. Increasing by the third multiple is based on the original size. For example, the third multiple is 10%, and the size of the object frame is 100. Increased by the third multiple, i.e., 10%, the size of the object frame is 110. In some embodiments, increasing the size of the object frame by the third multiple means separately increasing the width and height of the object frame by the third multiple. In some embodiments, the third multiple is preset by the computer device.

In another possible implementation, the computer device determines the position information in the first image of each object frame in the first image. Then, the computer device stores the position information of the object frame for subsequent determination of the object frame in the first image based on the position information.

302: The computer device determines an object frame in which an object belonging to a first type is located as a first target frame and determines an object frame in which an object belonging to a second type is located as an exclusion frame.

The computer device classifies the plurality of objects in the first image into the object belonging to the first type and the object belonging to the second type. The object belonging to the first type is an object needing to be reserved, i.e., key information needing to be given attention in the first image. The object belonging to the second type is an object not needing to be reserved, i.e., interference information not needing to be given attention in the first image. Therefore, the computer device determines the object frame in which the object belonging to the first type is located as the first target frame and determines the object frame in which the object belonging to the second type is located as the exclusion frame, thereby marking an area needing to be reserved and an area not needing to be reserved in the first image.

In a possible implementation, the computer device employs a first marking way to mark the object frame in which the object belonging to the first type is located so as to obtain the first target frame. In addition, the computer device employs a second marking way to mark the object frame in which the object belonging to the second type is located so as to obtain the exclusion frame. The first marking way is different from the second marking way. Thus, by identifying the marking way for the object frames to determine which object frames in the image belong to the first target frame and which object frames belong to the exclusion frame, the computer device is subsequently able to distinguish between the first target frame and the exclusion frame in the image.

In some embodiments, the first marking way means that the edge line of the object frame is set to a first color, and the second marking way means that the edge line of the object frame is set to a second color. The first color is different from the second color. For example, the first color is red, and the second color is blue. In some embodiments, the first marking way means that the edge line of the object frame is set to a first size, and the second marking way means that the edge line of the object frame is set to a second size. The first size is different from the second size. In some embodiments, the first marking way means that the object frame is set to a first shape, and the second marking way means that the object frame is set to a second shape. The first shape is different from the second shape. For example, the first shape is a circle, and the second shape is a square. In some embodiments, the first marking way means that the edge line of the object frame is set to a first pattern, and the second marking way means that the edge line of the object frame is set to a second pattern. The first pattern is different from the second pattern. For example, the first pattern is a full line, and the second pattern is a dashed line.

The above first marking way and second marking way are merely exemplary, and the embodiments of this application are not limited thereto. In some embodiments, the first marking way and the second marking way may be other cases, provided that it is ensured that the first marking way is different from the second marking way. Exemplarily, the first marking way may also mean that the edge line of the object frame is set to the first color, the first size and the first pattern, and that the object frame is set to the first shape. The second marking way may also mean that the edge line of the object frame is set to the second color, the second size and the second pattern, and that the object frame is set to the second shape.

In an embodiment of this application, since the target frame and the exclusion frame are obtained by marking the object frame with different marking ways, the computer device can distinguish the target frame and the exclusion frame in the image by identifying the marking way for the object frame. As a result, the automatic identification of the target frame and the exclusion frame is realized, which helps improve the speed of identifying the target frame and the exclusion frame. The computer device subsequently cuts the image based on the positions of the first target frame and the exclusion frame. Since the time taken to identify the target frame and the exclusion frame has been shortened, it is also possible to speed up the overall process of image cutting.

In a possible implementation, the determining, by the computer device, an object frame in which an object belonging to a first type is located as a first target frame includes at least one of the following (1) and (2).

(1) Determine a face frame in which a face is located as the first target frame.

The object frame in the first image includes the face frame in which the face is located. The face is key information needing to be given attention, so the face is an object needing to be reserved. Besides, the face is the object belonging to the first type. Therefore, the computer device determines the face frame in which the face is located as the first target frame.

(2) Determine an entity frame in which an entity is located as the first target frame.

The object frame in the first image includes the entity frame in which the entity is located. The entity is key information needing to be given attention, so the entity is an object needing to be reserved. Besides, the entity is the object belonging to the first type. Therefore, the computer device determines the entity frame in which the entity is located as the first target frame.

In a possible implementation, the determining, by the computer device, an object frame in which an object belonging to a second type is located as an exclusion frame includes at least one of the following (3) and (4).

(3) Determine a text frame in which a text is located as the exclusion frame.

The object frame in the first image includes the text frame in which the text is located. The text is interference information not needing to be given attention, so the text is an object not needing to be reserved. Besides, the text is the object belonging to the second type. Therefore, the computer device determines the text frame in which the text is located as the exclusion frame.

(4) Determine a watermark frame in which a watermark is located as the exclusion frame.

The object frame in the first image includes the watermark frame in which the watermark is located. The watermark is interference information not needing to be given attention, so the watermark is an object not needing to be reserved.

Besides, the watermark is the object belonging to the second type. Therefore, the computer device determines the watermark frame in which the watermark is located as the exclusion frame.

The ways to determine the first target frame and the exclusion frame described above are merely exemplary, and the embodiments of this application are not limited thereto. In some embodiments, the ways to determine the first target frame and the exclusion frame may also be flexibly adjusted according to the actual application scene. Exemplarily, if the actual application scene is a scene in which the text and the watermark need to be given attention, and the face and the entity do not need to be given attention, the text frame in which the text is located and the watermark frame in which the watermark is located may be determined as the first target frame, and the face frame in which the face is located and the entity frame in which the entity is located may be determined as the exclusion frame.

In some embodiments, the computer device stores configuration information. The configuration information includes a first type and a second type. The computer device compares the type to which an object in the first image belongs with the first type and the second type in the configuration information, thus determining which objects in the first image belong to the object of the first type and which objects belong to the object of the second type. For example, the configuration information is set in the computer device by the researchers and developers. By modifying the configuration information, the computer device is able to flexibly control the object that is reserved and the object that is not reserved in the cut image.

In another possible implementation, while determining a plurality of first target frames, the computer device increases the size of each of the first target frames by the first multiple to obtain a plurality of second target frames. For each of the second target frames, the second target frame is merged with other second target frames into a third target frame, when the second target frame intersects with other second target frame. That any two second target frames intersect means that there is an intersection point between the two target frames. In some embodiments, the first multiple is preset by the computer device. For example, the first multiple is 20%, and the computer device increases the size of each of the first target frames by 20%.

In an embodiment of this application, the computer device increases the size of each of the first target frames by the first multiple to obtain a plurality of second target frames. When a certain second target frame intersects with other second target frames, the object in the second target frame is relatively close to the objects in the other second target frames. If two objects belonging to the first type are located closely, it may result in the cut image including part of the information of the other object to cut the first image only based on the first target frame or the second target frame corresponding to one of the objects. Therefore, the computer device merges the second target frame and the other second target frames into the third target frame. The third target frame includes a plurality of objects relatively close to each other such that the first image can be subsequently cut based on the third target frame, thereby avoiding incomplete information in the cut image.

For example, if the second target frame A intersects with the second target frame B, the computer device merges the second target frame A and the second target frame B into the third target frame. For example, if the second target frame A intersects with both the second target frame B and the second target frame C, the computer device merges the second target frame A, the second target frame B, and the second target frame C into the third target frame. For example, if the second target frame A does not intersect with any other second target frames, the second target frame A remains independent and does not need to be merged with other second target frames.

For example, the first target frame is a face frame, and a second target frame obtained by increasing the first target frame includes a face. Taking the intersection of two second target frames as an example, if the second target frame intersects with other second target frames, the faces in the two second target frames are very close. If the computer device cuts the first image directly based on either of the first target frames in which the two faces are located, the cut image possibly includes part of the information of the other face, resulting in incomplete information in the image. Therefore, the computer device merges the two second target frames into the third target frame. The third target frame includes two faces. Then, the first image is subsequently cut based on the third target frame, and the cut image includes two faces.

303: The computer device determines a plurality of candidate areas in the first image based on a position of the exclusion frame.

Since the exclusion frame includes the objects not needing to be reserved, the computer device determines the plurality of candidate areas not including the exclusion frame in the first image based on the position of the exclusion frame. Each of the determined candidate areas does not include the objects not needing to be reserved so as to facilitate subsequent cutting of an image from the first image based on the candidate areas. The image does not include these objects not needing to be reserved.

In a possible implementation, the computer device determines a target edge line not overlapping with each edge line of the first image among edge lines of the exclusion frame. The computer device determines a straight line in which the target edge line is located and determines an area on an outer side of the straight line in the first image as the candidate area, the outer side of the straight line being a side away from the exclusion frame.

That the edge line of the exclusion frame does not overlap with the edge line of the first image means that the edge line of the exclusion frame does not lie on a straight line with the edge line of the first image. If a certain edge line of the exclusion frame overlaps with a certain edge line of the first image, the area on the outer side of the straight line in which the edge line is located is the area outside the first image, i.e., there is no candidate area on the outer side of the straight line in which the edge line is located in the first image. If a certain edge line of the exclusion frame does not overlap with each edge line of the first image, there is an area in the first image on the outer side of the straight line in which the edge line is located. Therefore, the area on the outer side of the straight line in which the edge line is located in the first image can be determined as the candidate area, and the candidate area determined by this method does not include the exclusion frame.

In some embodiments, the exclusion frame is a rectangular frame, and the exclusion frame includes a left edge line, a right edge line, an upper edge line, and a lower edge line. The target edge line may include at least one of the left edge line, the right edge line, the upper edge line, and the lower edge line of the exclusion frame. The determining, by the computer device, the candidate area based on the target edge line includes at least one of the following.

(1) Determine a first straight line in which the target edge line is located and determine an area on a left side of the first straight line in the first image as the candidate area, when the target edge line includes the left edge line of the exclusion frame.

When the target edge line includes the left edge line of the exclusion frame, the left side of the left edge line is a side away from the exclusion frame. Thus, the outer side of the first straight line in which the left edge line is located refers to the left side of the first straight line. Therefore, the computer device determines the area on the left side of the first straight line in the first image as the candidate area.

(2) Determine a second straight line in which the target edge line is located and determine an area on a right side of the second straight line in the first image as the candidate area, when the target edge line includes the right edge line of the exclusion frame.

When the target edge line includes the right edge line of the exclusion frame, the right side of the right edge line is a side away from the exclusion frame. Thus, the outer side of the second straight line in which the right edge line is located refers to the right side of the second straight line. Therefore, the computer device determines the area on the right side of the second straight line in the first image as the candidate area.

(3) Determine a third straight line in which the target edge line is located and determine an area on an upper side of the third straight line in the first image as the candidate area, when the target edge line includes the upper edge line of the exclusion frame.

When the target edge line includes the upper edge line of the exclusion frame, the upper side of the upper edge line is a side away from the exclusion frame. Thus, the outer side of the third straight line in which the upper edge line is located refers to the upper side of the third straight line. Therefore, the computer device determines the area on the upper side of the third straight line in the first image as the candidate area.

(4) Determine a fourth straight line in which the target edge line is located and determine an area on a lower side of the fourth straight line in the first image as the candidate area, when the target edge line includes the lower edge line of the exclusion frame.

When the target edge line includes the lower edge line of the exclusion frame, the lower side of the lower edge line is a side away from the exclusion frame. Thus, the outer side of the fourth straight line in which the lower edge line is located refers to the lower side of the fourth straight line. Therefore, the computer device determines the area on the lower side of the fourth straight line in the first image as the candidate area.

In some embodiments, when the exclusion frame is the rectangular frame, the number of the target edge lines not overlapping with each edge line of the first image in the exclusion frame may be 4, 3, 2, or 1. Then, the candidate area determined by the computer device includes the following 4 cases.

Figure 4:
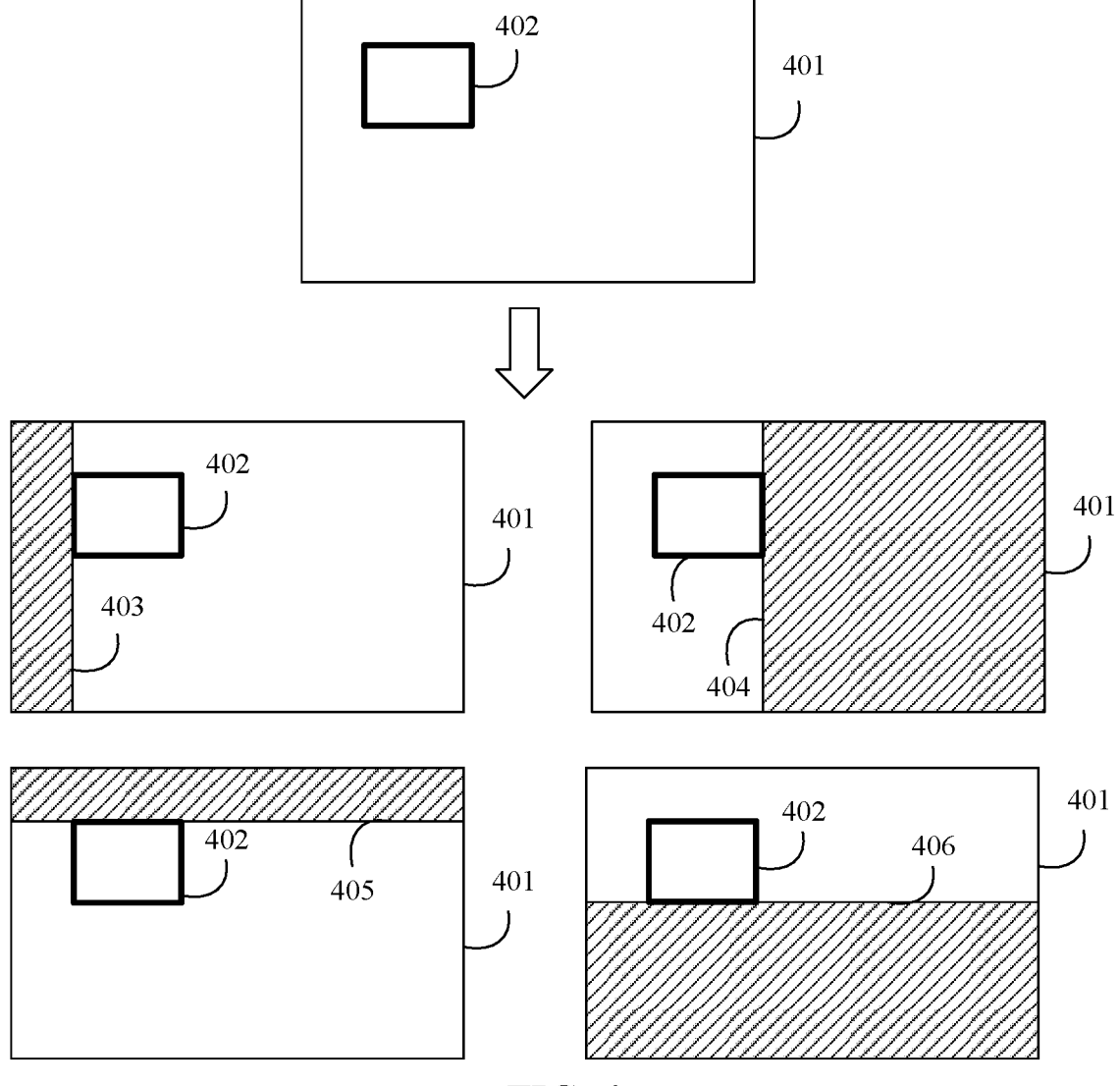
FIG. 4 is a schematic illustration of an image segmenting method provided in an embodiment of this application.

(1) When the number of the target edge lines is 4, reference is made to FIG. 4. FIG. 4 is a schematic illustration of an image segmenting method provided in an embodiment of this application. FIG. 4 includes the first image 401. The first image 401 includes the exclusion frame 402. The exclusion frame 402 is in a central area of the first image 401, and 4 edge lines of the exclusion frame 402 do not overlap with the edge lines of the first image 401. In the first image 401, the computer device determines the area on the left side of the straight line in which the left edge line of the exclusion frame 402 is located as the candidate area 403, determines the area on the right side of the straight line in which the right edge line of the exclusion frame 402 is located as the candidate area 404, determines the area on the upper side of the straight line in which the upper edge line of the exclusion frame 402 is located as the candidate area 405, and determines the area on the lower side of the straight line in which the lower edge line of the exclusion frame 402 is located as the candidate area 406. The shaded portions represent the candidate areas.

Therefore, when the number of the target edge lines is 4, the computer device can determine 4 candidate areas in the first image, and the 4 candidate areas can intersect with each other.

Figure 5:
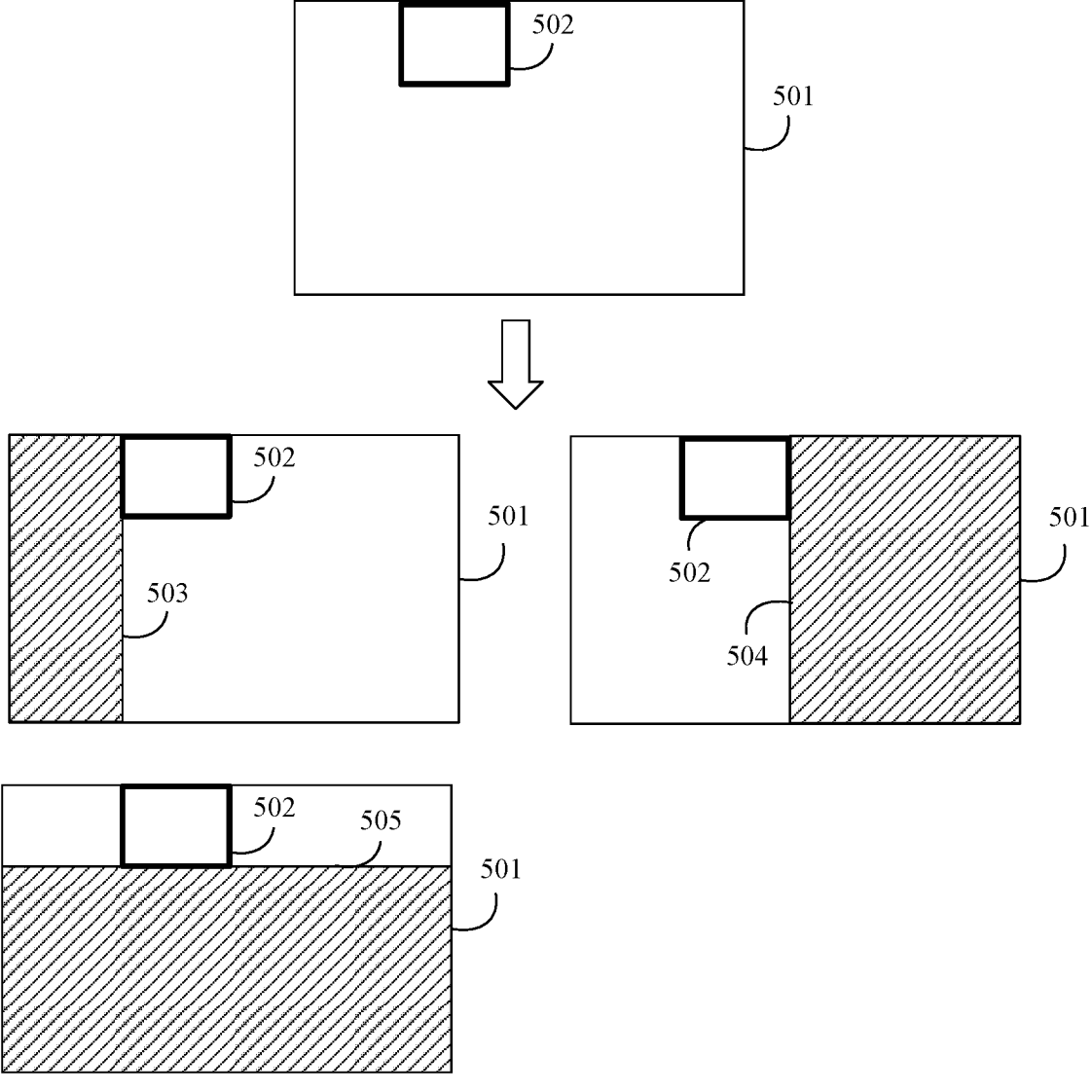
FIG. 5 is a schematic illustration of another image segmenting method provided in an embodiment of this application.

(2) When the number of target edge lines is 3, reference is made to FIG. 5. FIG. 5 is a schematic illustration of another image segmenting method provided in this application. FIG. 5 includes the first image 501. The first image 501 includes the exclusion frame 502 in an edge area of the first image 501. The upper edge line of the exclusion frame 502 overlaps with the upper edge line of the first image 501, and 3 other edge lines of the exclusion frame 502 do not overlap with the edge lines of the first image 501. In the first image 501, the computer device determines the area on the left side of the straight line in which the left edge line of the exclusion frame 502 is located as the candidate area 503, determines the area on the right side of the straight line in which the right edge line of the exclusion frame 502 is located as the candidate area 504, and determines the area on the lower side of the straight line in which the lower edge line of the exclusion frame 502 is located as the candidate area 505. The shaded portions represent the candidate areas.

Therefore, when the number of the target edge lines is 3, the computer device can determine 3 candidate areas in the first image, and the 3 candidate areas can intersect with each other.

Figure 6:
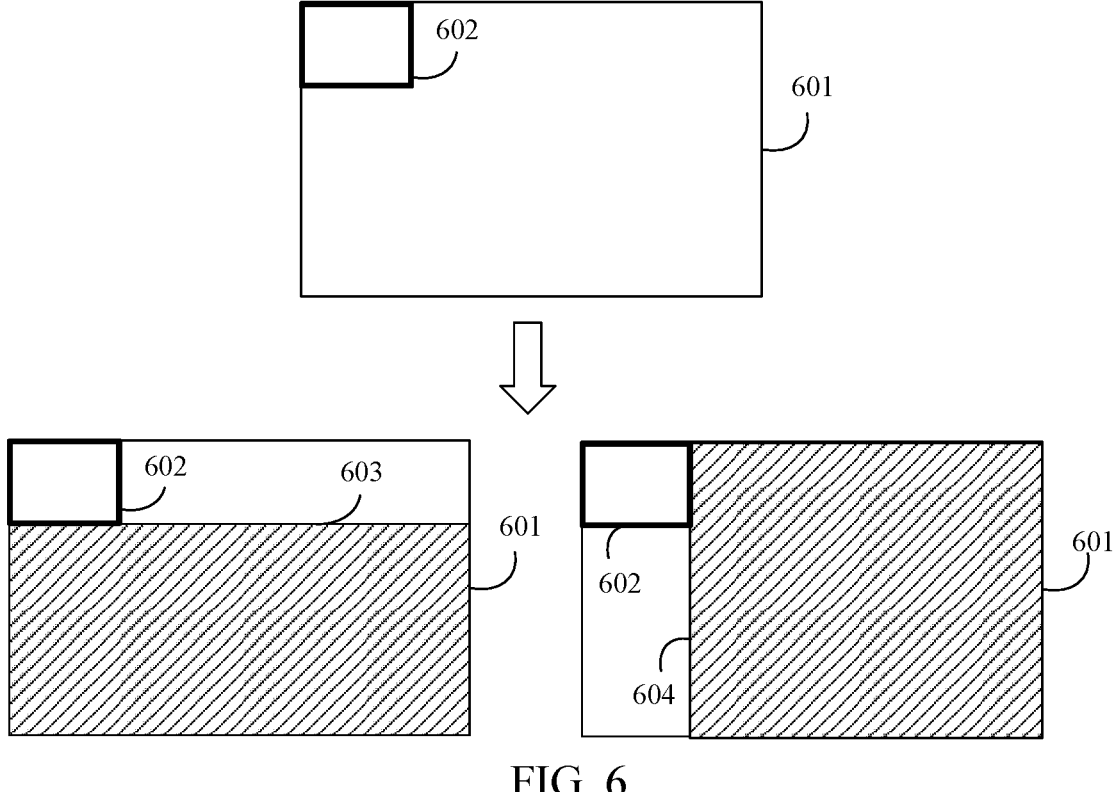
FIG. 6 is a schematic illustration of another image segmenting method provided in an embodiment of this application.

(3) When the number of target edge lines is 2, reference is made to FIG. 6. FIG. 6 is a schematic illustration of another image segmenting method provided in this application. FIG. 6 includes the first image 601. The first image 601 includes the exclusion frame 602 at a corner of the first image 601. The upper edge line and the left edge line of the exclusion frame 602 overlap with the edge lines of the first image 601, and the right edge line and the lower edge line of the exclusion frame 602 do not overlap with the edge lines of the first image 601. In the first image 601, the computer device determines the area on the lower side of the straight line in which the lower edge line of the exclusion frame 602 is located as the candidate area 603 and determines the area on the right side of the straight line in which the right edge line of the exclusion frame 602 is located as the candidate area 604. The shaded portions represent the candidate areas.

Therefore, when the number of the target edge lines is 2, the computer device can determine 2 candidate areas in the first image, and the 2 candidate areas can intersect with each other.

Figure 7:
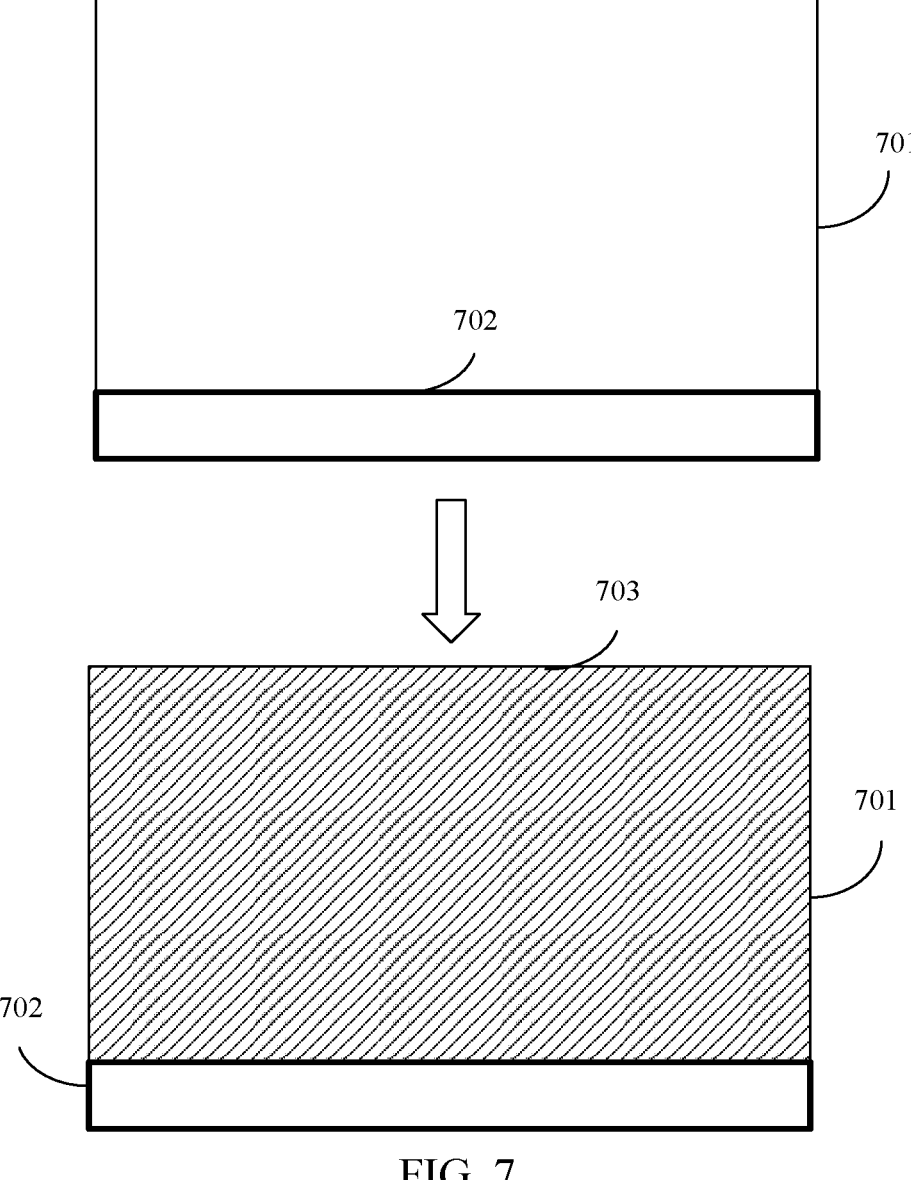
FIG. 7 is a schematic illustration of another image segmenting method provided in an embodiment of this application.

(4) When the number of target edge lines is 1, reference is made to FIG. 7. FIG. 7 is a schematic illustration of another image segmenting method provided in this application. FIG. 7 includes the first image 701. The first image 701 includes the exclusion frame 702. The left edge line, the right edge line, and the lower edge line of the exclusion frame 702 overlap with the edge lines of the first image 701, and the upper edge line of the exclusion frame 702 does not overlap with the edge lines of the first image 701. In the first image 701, the computer device determines the area on the upper side of the straight line in which the upper edge line of the exclusion frame 702 is located as the candidate area 703. The shaded portion represents the candidate area.

Therefore, when the number of the target edge lines is 1, the computer device can determine 1 candidate area in the first image.

In the embodiments of this application, based on the positions of the edge lines of the exclusion frame and the edge lines of the first image, the area in the first image is divided to determine the candidate area not including the exclusion frame in the first image. This method is simple logically, facilitates the implementation, and speeds up the image cutting.

In another possible implementation, the number of the exclusion frames is multiple. The determining, by the computer device, a plurality of candidate areas in the first image based on a position of the exclusion frame includes: determining a first candidate area in the first image based on a position of a first exclusion frame, the first candidate area not including the first exclusion frame, and the first exclusion frame being any one of the plurality of exclusion frames; determining a second candidate area of the first candidate area based on a position of a second exclusion frame, in response to the first candidate area including the second exclusion frame, the second candidate area not including the second exclusion frame, and the second exclusion frame being any one of the plurality of exclusion frames except the first exclusion frame; and taking the second candidate area as the candidate area to be determined, in response to the second candidate area not including any one of the exclusion frames.

Exemplarily, the first candidate area is taken as the candidate area to be determined, in response to the first candidate area not including any one of the exclusion frames.

Exemplarily, a third candidate area of the second candidate area is determined based on a position of a third exclusion frame, in response to the second candidate area including the third exclusion frame, the third candidate area not including the third exclusion frame, and the third exclusion frame being any one of the plurality of exclusion frames except the first exclusion frame and the second exclusion frame. The third candidate area is taken as the candidate area to be determined, in response to the third candidate area not including any one of the exclusion frames. A fourth candidate area of the third candidate area is determined based on a position of a fourth exclusion frame, in response to the third candidate area including the fourth exclusion frame, the fourth candidate area not including the fourth exclusion frame, and the fourth exclusion frame being any one of the plurality of exclusion frames except the first exclusion frame, the second exclusion frame, and the third exclusion frame. It can deduce the rest from this until a candidate area not including any one of the exclusion frames is obtained.

That is, the first candidate area in the first image is determined based on the position of the first exclusion frame, the first candidate area not including the first exclusion frame, and the first exclusion frame being any one of the plurality of exclusion frames; the second candidate area of the first candidate area based on the position of the second exclusion frame, the second candidate area not including the second exclusion frame; and so on until none of the obtained candidate areas includes any one of the exclusion frames.

That is, when the first image includes a plurality of exclusion frames, the computer device randomly determines a first exclusion frame among the plurality of exclusion frames and determines a first candidate area not including the first exclusion frame in the first image based on the position of the first exclusion frame. When the first candidate area includes a second exclusion frame, a second candidate area not including the second exclusion frame is determined in the first candidate area based on the position of the second exclusion frame, and so on until none of the obtained candidate areas includes any one of the exclusion frames.

For example, the number of the first candidate areas determined by the computer device is multiple. For each first candidate area, the computer device determines whether the first candidate area includes the exclusion frame. If the first candidate area does not include the exclusion frame, there is no need to continue processing the first candidate area, and the first candidate area is directly taken as a complete candidate area. If the first candidate area also includes the exclusion frame, the computer device determines a second candidate area not including the exclusion frame in the first candidate area based on the position of any one of the exclusion frames in the first candidate area. Then, the computer device continues to determine whether the obtained second candidate area also includes the exclusion frame. If not, the second candidate area is directly taken as a complete candidate area; if yes, the computer device continues to process the second candidate area until each of the obtained candidate areas does not include the exclusion frame, and a plurality of candidate areas not including the exclusion frame are obtained.

In some embodiments, the number of the first candidate areas determined by the computer device is multiple. The computer device deletes a first candidate area having a size smaller than a first threshold value from the determined plurality of first candidate areas. In this case, the subsequent step of determining the candidate area is performed based on the non-deleted first candidate area. Exemplarily, the second candidate area of the non-deleted first candidate area is determined based on the position of the second exclusion frame, in response to the non-deleted first candidate area including the second exclusion frame. The non-deleted first candidate area is taken as the candidate area to be determined, in response to the non-deleted first candidate area not including any one of the exclusion frames.

In an embodiment of this application, the candidate area does not include the exclusion frame, and the target area including the target frame is subsequently determined based on the candidate area so as to cut the first image based on the target area. If the size of the candidate area is too small, the possibility of determining the target area in the candidate area is small. Therefore, deleting the first candidate area having the size smaller than the first threshold value can reduce the invalid operations of not determining the target area in the first candidate area, thereby improving the operation efficiency. In addition, if the size of the candidate area is too small, the effect of the subsequent image cutting may also be affected. Therefore, deleting the first candidate area having the size smaller than the first threshold value can ensure that the size of the first candidate area is large enough to help ensure the image cutting effect.

The above embodiments are only described by taking the first candidate area as an example. In fact, each time the computer device determines a candidate area, it can first determine whether the size of the candidate area is smaller than the first threshold value. If the size is smaller than the first threshold value, the candidate area is deleted; if the size is not smaller than the first threshold value, the candidate area is reserved, and subsequent operations are continued.

In another possible implementation, the computer device establishes a spatial coordinate system corresponding to the first image, determines coordinate information of each exclusion frame based on the spatial coordinate system and the positions of the exclusion frame and the first target frame in the first image, and determines coordinate information of a plurality of candidate areas in the first image based on the coordinate information of the exclusion frame. Subsequently, the computer device performs the following step 304 to step 305 based on the coordinate information of the candidate areas. For example, the computer device determines the vertex of the lower left corner in the first image as the origin of the spatial coordinate system.

304: The computer device determines the target area including the first target frame among the plurality of candidate areas.

After determining the plurality of candidate areas, the computer device determines the target area including the first target frame among the plurality of candidate areas. Since the candidate areas do not include the exclusion frame, the target area includes the first target frame and does not include the exclusion frame.

For each candidate area, the computer device determines whether the candidate area includes a first target frame. If the candidate area includes the first target frame, the candidate area is determined as the target area; if the candidate area does not include the first target frame, the candidate area is not the target area. That the candidate area includes the first target frame means that the candidate area includes a complete first target frame. If the candidate area only includes part of the area of the first target frame, it is considered that the candidate area does not include the first target frame.

In a possible implementation, the computer device determines a plurality of candidate target areas including the first target frame among the plurality of candidate areas and determines a target area having the largest area among the plurality of candidate target areas.

Through the above step 303 to step 304, the computer device achieves that the target area in the first image is determined in the first image, the target area including the first target frame and not including the exclusion frame.

In a possible implementation, in step 302, while determining a plurality of first target frames, the computer device increases the size of each of the first target frames by the first multiple to obtain a plurality of second target frames. For each of the second target frames, the second target frame is merged with other second target frames into a third target frame, when the second target frame intersects with other second target frame. The computer device determines an area including the third target frame and not including the exclusion frame as the target area in the first image. In addition, it determines an area including a first target frame corresponding to a remaining second target frame and not including the exclusion frame as the target area in the first image.

The remaining second target frame refers to a second target frame skipping merging, and the first target frame corresponding to the second target frame refers to a first target frame of the second target frame obtained by increasing by the first multiple. The cutting target of the computer device is a merged third target frame and the first target frame to be increased of a second target frame skipping merging.

In some embodiments, step 304 is replaced with: The computer device determines the candidate area including the third target frame as the target area and determines a candidate area including the first target frame corresponding to the remaining second target frame as the target area among the plurality of candidate areas. The target area including the third target frame and the target area including the first target frame may be the same candidate area or different candidate areas.

In another possible implementation, the number of the first target frames is multiple. The computer device determines the target area including at least one of the first target frames and not including the exclusion frame in the first image.

That is, for each of the first target frames, the computer device determines the target area including the first target frame and does not include the exclusion frame in the first image. The target areas determined by different first target frames may be the same area or different areas. Thus, the computer device can determine at least one of the target areas. Each of the target areas may include a first target frame or a plurality of first target frames.

In some embodiments, step 304 is replaced with: The computer device determines the target area including at least one of the first target frames among the plurality of candidate areas.

In another possible implementation, the number of the first target frames is multiple. The computer device determines the target area including a face frame and not including the exclusion frame in the first image, when a plurality of first target frames include the face frame.

The face frame is an object frame including a face. For each type of the object in the first image, the face is a more noteworthy object, that is, an object more needing to be reserved than other types of objects. Thus, when the first target frame includes a face target frame, the computer device preferentially determines a target area including a face in the first image including a face frame. For example, the first target frame can be divided into two types: a face frame and an entity frame. The computer device first determines whether the face frame exists in the plurality of first target frames in the first image. If the face frame exists, the target area including the face frame is determined; if the face frame does not exist, the target area including the entity frame is determined.

In some embodiments, step 304 is replaced with: The computer device determines the target area including the face frame among the plurality of candidate areas, when the plurality of first target frames include the face frame.

The above step 303 to step 304 of an embodiment of this application provide an area division policy. Based on the positions of the exclusion frame and the first target frame in the first image, the target area not including the exclusion frame and including the first target frame can be divided in the first image. This method is simple logically and facilitates the implementation.

This embodiment of this application is described only by taking an example: the target area including the first target frame is determined among the plurality of candidate areas. In another embodiment, a failure of cutting the first image is determined, when each candidate area does not include the first target frame.

305: The computer device cuts the first image based on the target area to obtain a second image including the first target frame and not including the exclusion frame.

Since the cutting is performed on the basis of the target area, and the target area does not include the exclusion frame, the cut second image also does not include the exclusion frame. The second image includes the area framed by the first target frame and does not include the area framed by the exclusion frame. Thus, the second image includes the object needing to be reserved and does not include the object not needing to be reserved.

In a possible implementation, the computer device cuts the first image based on the target area to obtain the second image including the first target frame, not including the exclusion frame, and having a target aspect ratio.

The computer device cuts the first image based on the target area to obtain the second image having an aspect ratio being the target aspect ratio, and the cut second image includes the first target frame. By such way, an image complying with the target aspect ratio can be cut in the first image. In some embodiments, the target aspect ratio is preset by the computer device, or the target aspect ratio is transmitted to the computer device by another device to request the computer device to cut the image complying with the target aspect ratio. For example, the target aspect ratio is 1:3 and the like.

In some embodiments, The cutting, by the computer device, to obtain the second image having an aspect ratio being the target aspect ratio includes: The computer device increases at least one of a width or a height of the first target frame to obtain a fourth target frame such that an aspect ratio of the fourth target frame is the target aspect ratio; keeps a central point of the fourth target frame unchanged and increases a size of the fourth target frame until the size is increased by a second multiple or any edge line of the increased fourth target frame overlaps with an edge line of the target area to obtain a fifth target frame; and cuts the fifth target frame from the first image and determines the cut fifth target frame as the second image.

The computer device first increases at least one of the width or the height of the first target frame such that the aspect ratio of the fourth target frame obtained after the increase is the target aspect ratio, thereby cutting an image with the target aspect ratio. The fourth target frame is located in the target area, and the target area includes the fourth target frame and does not include the exclusion frame. The size of the fourth target frame may be small. If the fourth target frame is directly cut from the first image, and the cut fourth target frame is determined as the second image, the size of the second image may also be small. As a result, the image cutting effect is not good, and thus the computer device increases the fourth target frame.

If the increase multiple of the fourth target frame is great, the size of the fifth target frame obtained after the increase will be great. As a result, the proportion of the area covered by the object in the fifth target frame is too small to highlight the object, resulting in a poor effect of image cutting. Thus, the computer device increases the fourth target frame with the second multiple as a limit, until the fifth target frame is obtained by increasing by the second multiple. In addition, there may be an exclusion frame outside the target area, so the computer device increases the fourth target frame with the target area as a limit, until any edge line of the increased fourth target frame overlaps with any edge line of the target area to obtain the fifth target frame.

The computer device is simultaneously limited to the second multiple and the target area to avoid the above two problems. In the process of increasing the fourth target frame, the computer device determines whether increasing by the second multiple is achieved and determines whether any edge line of the increased fourth target frame overlaps with any edge line of the target area. As long as one of the above two determination conditions is satisfied, the computer device stops continuing to increase and obtains the fifth target frame. That is, in the process of increasing the fourth target frame, if the increase multiple reaches the second multiple, the increase is stopped; or if any edge line of the increased fourth target frame overlaps with any edge line of the target area, the increase is also stopped.

Figure 8:
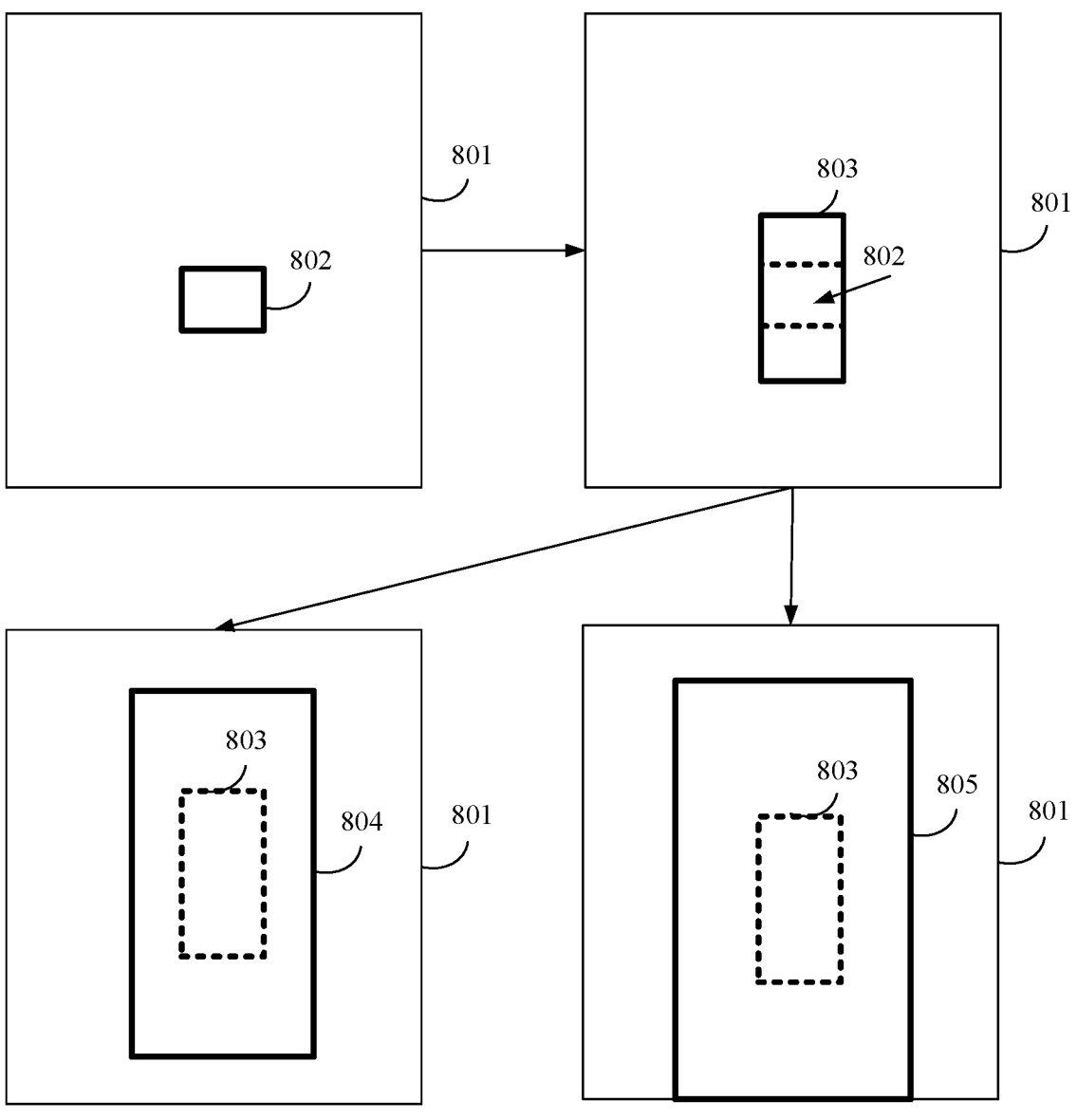
FIG. 8 is a schematic illustration of an image cutting method provided in an embodiment of this application.

FIG. 8 is a schematic illustration of an image cutting method provided in an embodiment of this application. FIG. 8 includes the target area 801 and the first target frame 802. The computer device increases the height of the first target frame 802 to obtain the fourth target frame 803 having a target aspect ratio. Besides, the computer device increases the size of the fourth target frame 803 in an equal proportion to obtain the fifth target frame. The fifth target frame includes the following two cases.

First case: As illustrated in the lower left corner of FIG. 8, in the process of increasing the size of the fourth target frame 803 by the computer device, if the increasing by the second multiple is performed before the edge line of the increased fourth target frame overlaps with the edge line of the target area, the computer device stops to increase and obtains the fifth target frame 804. The fifth target frame 804 has an aspect ratio being the target aspect ratio.

Second case: As illustrated in the lower right corner of FIG. 8, in the process of increasing the size of the fourth target frame 803 by the computer device, if the edge line of the increased fourth target frame overlaps with the edge line of the target area before the increasing by the second multiple is performed, the computer device stops to increase and obtains the fifth target frame 805. The fifth target frame 805 has an aspect ratio being the target aspect ratio.

The above step 305 of an embodiment of this application provides an image cutting policy. The second image including the first target frame and not including the exclusion frame can be obtained by cutting the first image based on the target area, and the second image having an aspect ratio being the target aspect ratio can also be obtained. The operation is simple and improves the flexibility of image cutting.

In order to evaluate the image cutting method provided in the embodiments of this application, the computer device performs the image cutting using the method provided in the embodiments of this application and the method provided in the related art. The effect of the cut image is determined by manual evaluation, and an image with a poor cutting effect can be classified as a bad case. Experimental results show that, compared with the related art, the bad case rate of the method provided in the embodiments of this application is less than 15%, while that of the method provided in the related art is about 60%. That is, the method provided in the embodiments of this application significantly improves the image cutting effect. In addition, the bad case needs to be processed manually, costing a lot of manpower and time. Therefore, by reducing the bad case rate, the method provided in the embodiments of this application can significantly improve the image cutting efficiency and reduce the manpower and time costs.

This embodiment of this application is described by taking an example: the execution entity is the computer device. In a possible implementation, the computer device is a server in the implementation environment as shown in FIG. 1. In another possible implementation, the computer device is a terminal in the implementation environment as shown in FIG. 1.

The method provided in the embodiments of this application divides objects in a first image into objects needing to be reserved and objects not needing to be reserved, marks areas in which the objects needing to be reserved and the objects not needing to be reserved are located by determining a first target frame and an exclusion frame, and cuts the first image based on a target area to obtain a second image including the first target frame and not including the exclusion frame since the target area in the first image includes the first target frame and does not include the exclusion frame. The first target frame and the exclusion frame are used to mark the areas in which the objects needing to be reserved and the objects not needing to be reserved are located in the image, facilitating rapid identification of the target area and improving the image cutting speed. In addition, the objects needing to be reserved can be considered as key information needing to be given attention, and the objects not needing to be reserved can be considered as interference information not needing to be given attention. Therefore, such image cutting method ensures that the second image includes the key information needing to be given attention and excludes the interference information not needing to be given attention, thus improving the image cutting effect.

In addition, the size of each of the first target frames is increased by the first multiple to obtain a plurality of second target frames. When a certain second target frame intersects with other second target frames, the object in the second target frame is relatively close to the objects in the other second target frames. Therefore, the computer device merges the second target frame and the other second target frames into the third target frame. The third target frame includes a plurality of objects relatively close to each other such that the first image can be subsequently cut based on the third target frame, thereby avoiding incomplete information in the cut image.

In addition, based on the positions of the edge lines of the exclusion frame and the edge lines of the first image, the area in the first image is divided to determine the candidate area not including the exclusion frame in the first image. This method is simple logically, facilitates the implementation, and speeds up the image cutting.

In addition, the candidate area does not include the exclusion frame, and the target area including the target frame is subsequently determined based on the candidate area so as to cut the first image based on the target area. Therefore, deleting the first candidate area having the size smaller than the first threshold value can reduce the invalid operations of not determining the target area in the first candidate area, thereby improving the operation efficiency. In addition, deleting the first candidate area having the size smaller than the first threshold value can ensure that the size of the candidate area is large enough to help ensure the image cutting effect.

FIG. 9 is a flowchart of an image cutting method provided in an embodiment of this application. The execution entity of an embodiment of this application is a computer device. With reference to FIG. 9, the method includes the following step 901 to step 907.

901: A computer device acquires a plurality of associated images corresponding to a first video, in response to a cover setting request.

The cover setting request is used for requesting the computer device to set a cover for the first video. Thus, the computer device acquires the plurality of associated images corresponding to the first video, in response to the cover setting request, the associated images being used for presenting a content of the first video. Thus, the cover of the first video can be subsequently determined based on the plurality of associated images. In a possible implementation, the cover setting request is transmitted by another device. For example, the computer device is a server in the implementation environment as shown in FIG. 1, another device is a terminal in the implementation environment as shown in FIG. 1, and the cover setting request is transmitted by the terminal to the server. In another possible implementation, the cover setting request is directly acquired by the computer device. For example, the computer device is a terminal in the implementation environment as shown in FIG. 1, and the terminal may directly acquire the cover setting request.

In a possible implementation, the computer device acquires an alternative cover and a video identification carried in the cover setting request, in response to the cover setting request. The computer device acquires at least one video frame corresponding to the video identification in the video frame database and determines the alternative cover and the at least one video frame as the associated images corresponding to the first video.

The cover setting request carries the alternative cover and the video identification. The video identification indicates the first video. For example, the video identification is a name or number of the first video. The alternative cover can present the content of the first video and is used for setting the cover of the first video. For example, the alternative cover is a cover uploaded by a user.

The video frame database is used for storing a video frame of any video, each video frame corresponds to a video identification of a video in which the video frame is located, and the video frame database stores a video frame of the first video. Since the video identification in the cover setting request indicates the first video, the computer device acquires at least one video frame corresponding to the video identification in the video frame database. The at least one video frame is the video frame of the first video, and therefore the at least one video frame can present the content of the first video.

Accordingly, the computer device determines the alternative cover and the at least one video frame as the associated images corresponding to the first video so as to subsequently set the cover for the first video based on the determined plurality of associated images.

The above way to acquire the associated images corresponding to the first video is merely exemplary, and the embodiments of this application are not limited thereto. Exemplarily, the way to acquire the associated images corresponding to the first video can also be: In response to the cover setting request, the computer device acquires the video identification carried in the cover setting request; the computer device acquires at least one video frame corresponding to the video identification in the video frame database and determines the at least one video frame as the associated images corresponding to the first video.

902: The computer device separately performs definition recognition on the plurality of associated images to obtain a definition of each of the associated images and determines an image having a definition greater than a fourth threshold value as a first image in the plurality of associated images.

The plurality of associated images are used for setting the cover of the first video. If the definition of the associated images is not high enough, the cover of the first video will be blurred, and the cover effect of the first video is not good enough. Thus, the computer device first performs definition recognition on the plurality of associated images to obtain the definition of each of the associated image. For each of the associated image, if the definition of the associated image is greater than the fourth threshold value, which indicates that the associated image is clear enough, the computer device determines the associated image as the first image; if the definition of the associated image is not greater than the fourth threshold value, which indicates that the associated image is not clear enough, the computer device discards the associated image. Accordingly, the computer device can screen the plurality of associated images to obtain the first image having the definition greater than the fourth threshold value based on the definition. In some embodiments, the fourth threshold value is preset by the computer device.

In a possible implementation, the computer device stores a definition recognition model configured to recognize the definition of the image. Based on the definition recognition model, the computer device performs definition recognition on the plurality of associated images to obtain the definition of each of the associated images. Exemplarily, the structure of the definition recognition model may be any neural network model, which is not limited in the embodiments of this application. The definition recognition model may be obtained through supervised training. For example, according to a sample image and a definition label corresponding to the sample image, a definition recognition model may be obtained through supervised training.

In some embodiments, the computer device uses the first numerical value and the second numerical value to indicate the definition of the associated images. The first numerical value indicates that the definition of the associated images is low, and the second numerical value indicates that the definition of the associated images is high. For example, if the first numerical value is 0, and the second numerical value is 1, the computer device determines the associated image having the definition being the second numerical value as the first image.

By performing the above step 901 to step 902, the computer device achieves acquiring the first image in response to the cover setting request for the first video, the first image being used for presenting the content of the first video. Besides, the computer device may also acquire the first image in other ways. For example, if the first image is carried in the cover setting request, the computer device may acquire the first image directly in the cover setting request.

903: The computer device determines an object frame in which each object in the first image is located.

904: The computer device determines an object frame in which an object belonging to a first type is located as a first target frame and determines an object frame in which an object belonging to a second type is located as an exclusion frame.

905: The computer device determines a target area in the first image, the target area including the first target frame and not including the exclusion frame.

906: The computer device cuts the first image based on the target area to obtain a second image including the first target frame and not including the exclusion frame.

The above step 903 to step 906 are only described by taking an example: the first image is processed to obtain the second image. In another embodiment, in the above step 902, the computer device determines a plurality of first images, and the computer device performs the above step 903 to step 906 on at least one of the first images based on the arrangement order of the plurality of first images.

For any one of the plurality of first images, the computer device performs cutting on the first image. If the second image is successfully obtained by cutting the first image, there is no need to cut other first images after the first image. If the second image is not obtained by cutting the first image, the computer device continues to cut other first images after the first image until the second image is successfully obtained. In some embodiments, when the first image includes the alternative cover, the computer device preferentially cuts the alternative cover.

Exemplarily, there are many cases that the second image is not obtained by cutting the first image. For example, when the above step 905 is performed on the first image, the target area including the first target frame and not including the exclusion frame cannot be determined in the first image. Alternatively, when the above step 906 is performed on the first image, the second image including the first target frame and not including the exclusion frame cannot be obtained by cutting the first image.

Exemplarily, the computer device may set a plurality of covers having different aspect ratios for the first video. Then the computer device determines a plurality of different target aspect ratios, and the computer device performs the above step 903 to step 906 on the plurality of first images based on the arrangement order of the plurality of first images to obtain second images having the aspect ratios separately being the plurality of target aspect ratios.

In addition, the process of obtaining the second image in the above step 903 to step 906 is the same as the process of obtaining the second image in the above step 301 to step 305, so it will not be described in detail herein.

907: The computer device determines the second image as a cover of the first video, or adjusts the second image to a target size and determines the adjusted second image as the cover of the first video.

The second image includes the object needing to be reserved and does not include the object not needing to be reserved. The computer device determines the second image as the cover of the first video, and the cover of the first video includes key information needing to be given attention and does not include interference information not needing to be given attention. As a result, the amount of information about the key information of the video cover is increased and the amount of information about the interference information of the video cover is reduced, thereby improving the presentation effect of the video cover.

In addition, if the cover of the first video has a size requirement, for example, the cover of the first video needs to be presented in a cover presentation area with the target size, the computer device first adjusts the second image to the target size and determines the adjusted second image as the cover of the first video to fit the cover of the first video to the cover presentation area. Exemplarily, the target size may be greater or smaller than the size of the second image. If the target size is greater than the size of the second image, the computer device increases the second image to the target size and determines the increased second image as the cover of the first video; if the target size is smaller than the size of the second image, the computer device reduces the second image to the target size and determines the reduced second image as the cover of the first video.

In some embodiments, the aspect ratio of the cover presentation area is the target aspect ratio. Then, the computer device obtains the second image having the aspect ratio being the target aspect ratio by cutting the first image in the above step 903 to step 906, and the computer device adjusts (e.g. zooming in or out) the second image with the target aspect ratio to a target size to obtain the adjusted (e.g. zooming in or out) second image in step 907.

This embodiment of this application is described by taking an example: the target size is different from the size of the second image. In some embodiments, the target size may also be the same as the size of the second image. In this case, the computer device determines the second image as the cover of the first video.

In a possible implementation, the computer device segments the second image into a plurality of image areas;

determines difference parameters between a brightness of a plurality of pixel points in the image area for each of the image areas; determines the number of the difference parameters not smaller than a second threshold value based on the difference parameters separately corresponding to the plurality of image areas; and determines the second image as the cover of the first video, or adjusts (e.g. zooming in or out) the second image to the target size and determines the adjusted (e.g. zooming in or out) second image as the cover of the first video, when the number is greater than a third threshold value. In some embodiments, the second threshold value and the third threshold value are preset by the computer device.

The difference parameter between the brightnesses indicates the degree of the difference between the brightnesses. The smaller the difference parameter indicates, the more similar the plurality of brightnesses are; the greater the difference parameter indicates, the greater the difference between the plurality of brightnesses is. For example, the difference parameter is a variance or a standard deviation between a plurality of brightnesses. Exemplarily, the brightness is used for indicating how bright the color of a pixel point is. For example, the brightness is a parameter corresponding to the V channel in the Hue-Aturation-Value (HSV) color space.

Exemplarily, if the difference parameter between the brightness of the plurality of pixel points in the image area is smaller than the second threshold value, which indicates color proximity between the plurality of pixel points in the image area, the image area may be approximated as a pure color area. If the number of difference parameters which are not smaller than the second threshold value is not greater than the third threshold value in the difference parameters separately corresponding to the plurality of image areas, which indicates that the number of difference parameters which are smaller than the second threshold value is great, namely, the number of pure color areas in the second image is great, then the amount of information about the second image is less. If the cover of the first video is determined based on the second image, the amount of information about the determined cover is less, and the presentation effect of the video cover is not good. Thus, if the number of difference parameters which are not smaller than the second threshold value is greater than the third threshold value, which indicates that the number of difference parameters which are not smaller than the second threshold value is great, namely, the number of pure color areas in the second image is small, then the amount of information about the second image is large enough. Thus, the computer device determines the cover of the first video based on the second image. Exemplarily, the difference parameter separately corresponding to any one image area refers to a difference parameter between the brightness of a plurality of pixel points in the any one image area.

In an embodiment of this application, the second image is screened based on the difference parameter between the brightness of each pixel point in the second image, the second image with a small amount of information is discarded, and the cover of the first video is determined based on the second image with a large amount of information, thus ensuring that the amount of information about the cover of the first video is large enough to improve the presentation effect of the cover of the first video.

Figures 10, 11:
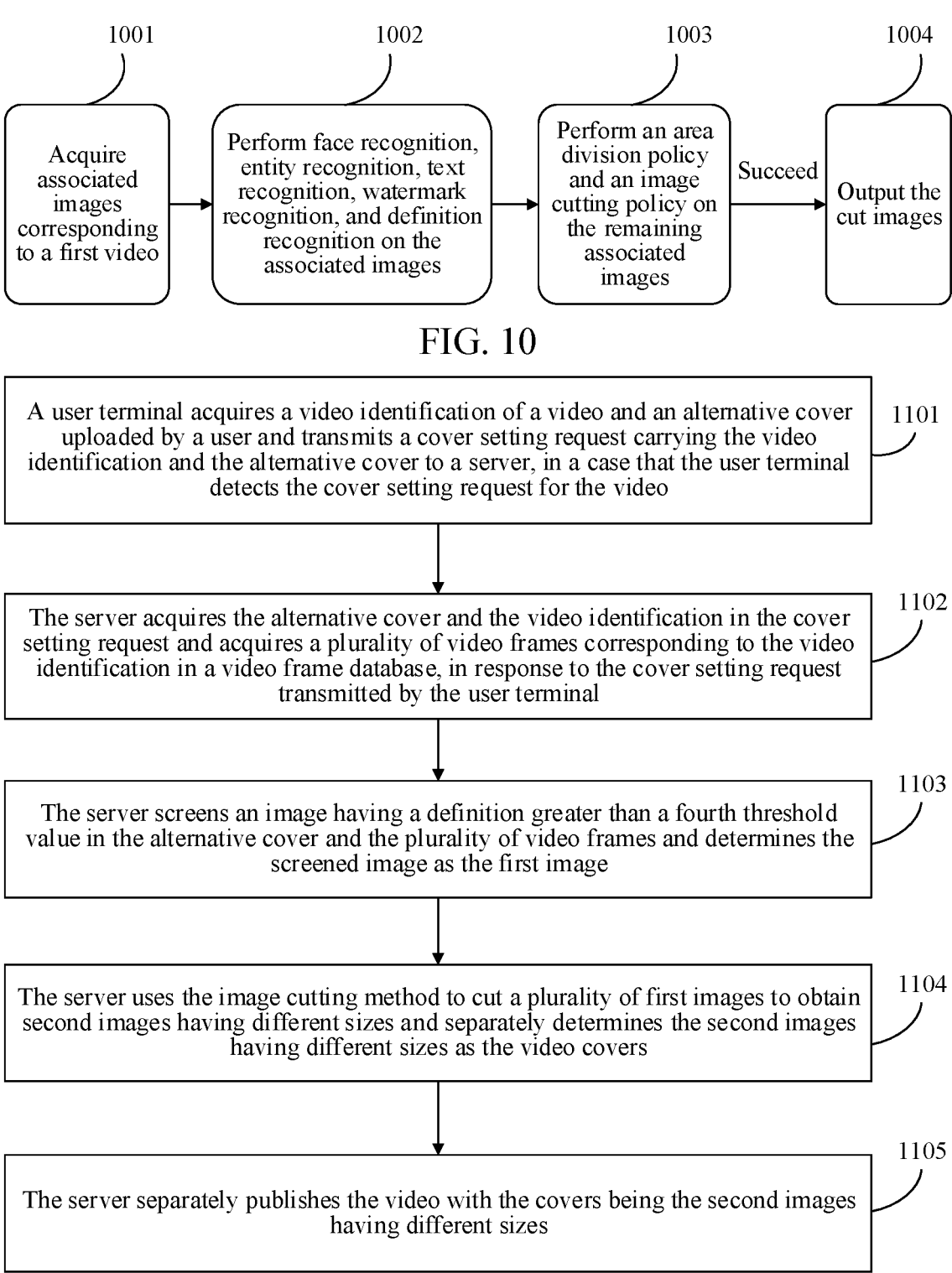
FIG. 10 is a flowchart of an image cutting method provided in an embodiment of this application.
FIG. 11 is a flowchart of another image cutting method provided in an embodiment of this application.

FIG. 10 is a flowchart of another image cutting method provided in an embodiment of this application. With reference to FIG. 10, the method includes the following step 1001 to step 1004.

1001: A computer device acquires associated images corresponding to a first video.

The associated images include an alternative cover of the first video and a video frame of the first video.

1002: The computer device separately performs face recognition, entity recognition, text recognition, watermark recognition, and definition recognition on the associated images to determine a face frame, an entity frame, a text frame, and a watermark frame in the associated images and a definition of the associated images for each of the associated images.

Exemplarily, the computer device discards associated images having the definition no greater than a fourth threshold value, determines the face frame and the entity frame in the remaining associated images as target frames needing to be reserved, and determines the text frame and the watermark frame as exclusion frames not needing to be reserved.

1003: The computer device performs an area division policy and an image cutting policy on the remaining associated images.

The area division policy is the method in the above step 303 to step 304, and the image cutting policy is the method in the above step 305.

1004: The computer device outputs images obtained by cutting the associated images.

In an embodiment of this application, the computer device performs the area division policy and the image cutting policy on the image to cut an image as the video cover, which significantly improves the cover cutting efficiency and reduces manpower and time costs.

This embodiment of this application is described by taking an example: the execution entity is the computer device. In a possible implementation, the computer device is a server in the implementation environment as shown in FIG. 1. In another possible implementation, the computer device is a terminal in the implementation environment as shown in FIG. 1.

The method provided in the embodiments of this application divides objects in a first image into objects needing to be reserved and objects not needing to be reserved, marks areas in which the objects needing to be reserved and the objects not needing to be reserved are located by determining a first target frame and an exclusion frame, and cuts the first image based on a target area to obtain a second image including the first target frame and not including the exclusion frame since the target area in the first image includes first target frame and does not include the exclusion frame. The first target frame and the exclusion frame are used to mark the areas in which the objects needing to be reserved and the objects not needing to be reserved are located in the image, facilitating rapid identification of the target area and improving the image cutting speed. In addition, the objects needing to be reserved can be considered as key information needing to be given attention, and the objects not needing to be reserved can be considered as interference information not needing to be given attention. Therefore, such image cutting method ensures that the second image includes the key information needing to be given attention and excludes the interference information not needing to be given attention, thus improving the image cutting effect.

In addition, this embodiment of this application provides a method for cutting the video cover. Since the second image includes the object needing to be reserved and does not include the object not needing to be reserved, the computer device determines the cover of the first video based on the second image, and the cover of the first video includes key information needing to be given attention and does not include interference information not needing to be given attention. As a result, the amount of information about the key information of the video cover is increased and the amount of information about the interference information of the video cover is reduced, thereby improving the presentation effect of the video cover.

In addition, the plurality of associated images are screened to obtain the first image having the definition greater than the fourth threshold value based on the definition. Since the first image is used for setting the cover of the first video, by ensuring the definition of the first image, the definition of the cover of the first video can be ensured, thereby improving the presentation effect of the cover of the first video.

In addition, the second image is screened based on the difference parameter between the brightness of each pixel point in the second image, the second image with a small amount of information is discarded, and the cover of the first video is determined based on the second image with a large amount of information, thus ensuring that the amount of information about the cover of the first video is large enough to improve the presentation effect of the cover of the first video.

The embodiments described above can be applied to any scene where image cutting is required. For example, in the field of video sharing, when a terminal requests a server to set a cover for a video, the server can cut an image related to the video content, and the cut image is determined as the cover of the video. FIG. 11 is a flowchart of an image cutting method provided in an embodiment of this application. With reference to FIG. 11, the method includes the following step 1101 to step 1105.

1101: A user terminal acquires a video identification of a video and an alternative cover uploaded by a user and transmits a cover setting request carrying the video identification and the alternative cover to a server, when the user terminal detects the cover setting request for the video.

The cover setting request is triggered by a cover setting operation performed by the user in the user terminal.

1102: The server acquires the alternative cover and the video identification in the cover setting request and acquires a plurality of video frames corresponding to the video identification in a video frame database, in response to the cover setting request transmitted by the user terminal.

1103: The server screens an image having a definition greater than a fourth threshold value in the alternative cover and the plurality of video frames and determines the screened image as the first image.

1104: The server uses the image cutting method provided in the embodiment of FIG. 3 to cut a plurality of first images to obtain second images having different sizes and separately determines the second images having different sizes as the video covers.

1105: The server separately publishes the video with the covers being the second images having different sizes.

The cover setting request transmitted by the terminal is also used for requesting to publish a video with a set cover. Therefore, after separately determining the second images having different sizes as the video cover, the computer device publishes the video with the covers being the second images having different sizes.

In a video sharing scene, when the user terminal publishes a video, a suitable cover will not be prepared for the video, but covers having different sizes need to be used in different distribution scene. Therefore, the server uses the method provided in the embodiment of FIG. 3 to automatically cut covers having different sizes for the video, which can improve the presentation effect of the video cover and reduces manpower.

In addition to cutting covers for a video in the field of video sharing, the image cutting method provided in the above embodiments can also be applied in other scenes. For example, when it is necessary to perform integrated processing on the images having different sizes, a plurality of images having different sizes are cut to the same size using the image cutting method provided in the above embodiments. For example, in the field of image sharing, an image is cut to a required size. The embodiments of this application do not define an application scene of the image cutting method.

Figure 12:
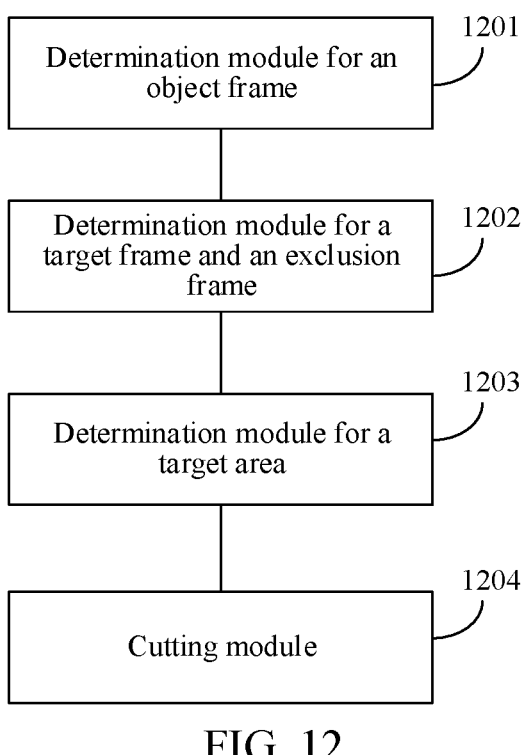
FIG. 12 is a schematic structural diagram of an image cutting apparatus provided in an embodiment of this application.

FIG. 12 is a schematic structural diagram of an image cutting apparatus provided in an embodiment of this application. With reference to FIG. 12, the apparatus includes:

a determination module for an object frame 1201, configured to determine an object frame in which each object in a first image is located;

a determination module for a target frame and an exclusion frame 1202, configured to determine an object frame in which an object belonging to a first type is located as a first target frame and determine an object frame in which an object belonging to a second type is located as an exclusion frame, the object of the first type being an object needing to be reserved, and the object of the second type being an object not needing to be reserved;

a determination module for a target area 1203, configured to determine a target area in the first image, the target area including the first target frame and not including the exclusion frame; and a cutting module 1204, configured to cut the first image based on the target area to obtain a second image including the first target frame and not including the exclusion frame.

The image cutting apparatus provided in the embodiments of this application divides objects in a first image into objects needing to be reserved and objects not needing to be reserved, marks areas in which the objects needing to be reserved and the objects not needing to be reserved are located by determining a first target frame and an exclusion frame, and cuts the first image based on a target area to obtain a second image including the first target frame and not including the exclusion frame since the target area in the first image includes the first target frame and does not include the exclusion frame. The first target frame and the exclusion frame are used to mark the areas in which the objects needing to be reserved and the objects not needing to be reserved are located in the image, facilitating rapid identification of the target area and improving the image cutting speed. In addition, the objects needing to be reserved can be considered as key information needing to be given attention, and the objects not needing to be reserved can be considered as interference information not needing to be given attention. Therefore, such image cutting method ensures that the second image includes the key information needing to be given attention and excludes the interference information not needing to be given attention, thus improving the image cutting effect.

Figure 13:
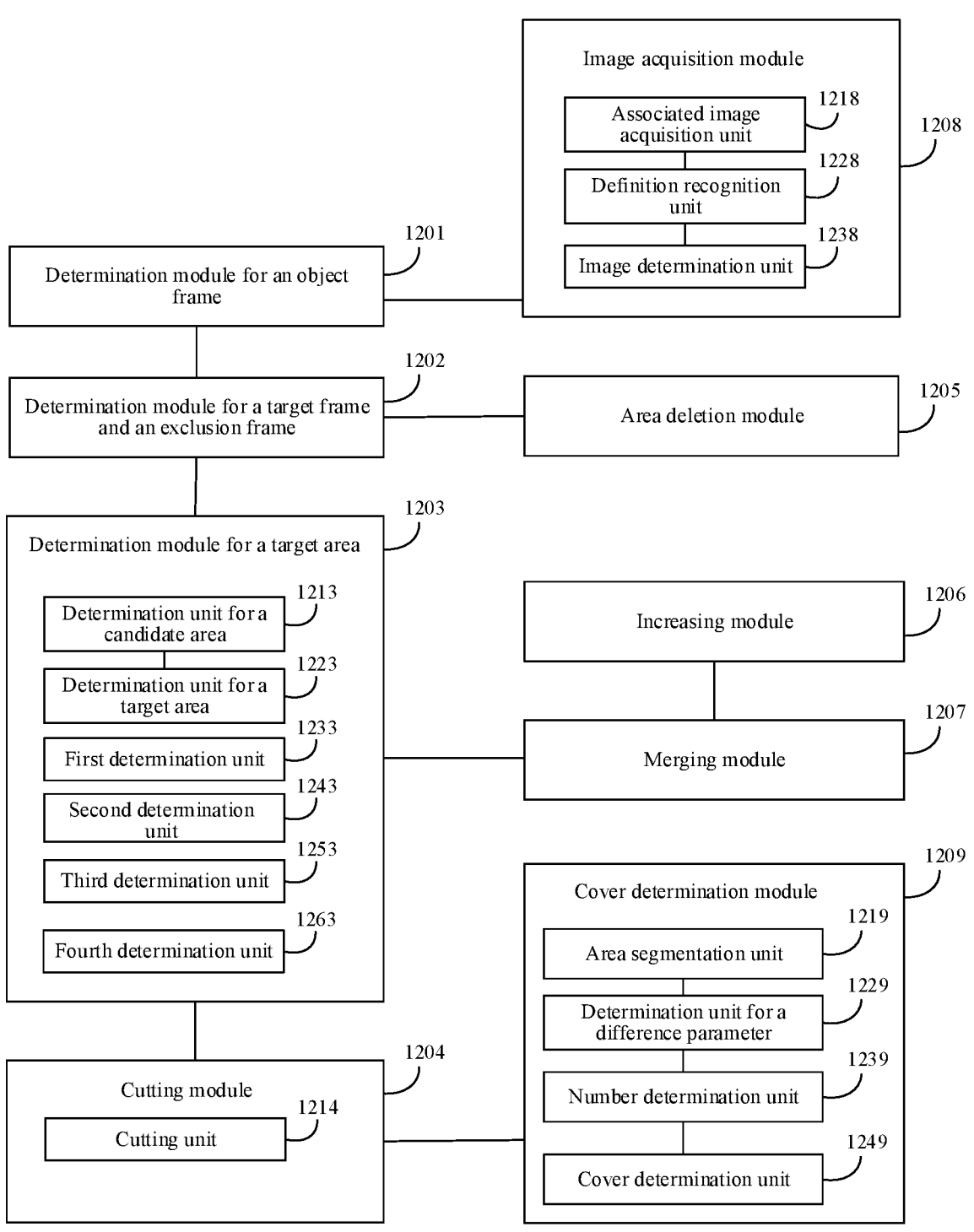
FIG. 13 is a schematic structural diagram of another image cutting apparatus provided in an embodiment of this application.

In some embodiments, with reference to FIG. 13, the determination module for a target area 1203 includes:

a determination unit for a candidate area 1213, configured to determine a plurality of candidate areas in the first image based on a position of the exclusion frame, each of the candidate areas not including the exclusion frame; and a determination unit for a target area 1223, configured to determine the target area including the first target frame among the plurality of candidate areas.

In some embodiments, with reference to FIG. 13, the determination unit for a candidate area 1213 is configured to:

determine a target edge line not overlapping with each edge line of the first image among edge lines of the exclusion frame; and determine a straight line in which the target edge line is located and determine an area on an outer side of the straight line in the first image as the candidate area, the outer side of the straight line being a side away from the exclusion frame.

In some embodiments, with reference to FIG. 13, the determination unit for a candidate area 1213 is configured to perform at least one of the following:

determining a first straight line in which the target edge line is located and determining an area on a left side of the first straight line in the first image as the candidate area, when the target edge line includes the left edge line of the exclusion frame;

determining a second straight line in which the target edge line is located and determining an area on a right side of the second straight line in the first image as the candidate area, when the target edge line includes the right edge line of the exclusion frame;

determining a third straight line in which the target edge line is located and determining an area on an upper side of the third straight line in the first image as the candidate area, when the target edge line includes the upper edge line of the exclusion frame; and determining a fourth straight line in which the target edge line is located and determining an area on a lower side of the fourth straight line in the first image as the candidate area, when the target edge line includes the lower edge line of the exclusion frame.

In some embodiments, with reference to FIG. 13, the number of the exclusion frames is multiple, and the determination unit for a candidate area 1213 is configured to:

determine a first candidate area in the first image based on a position of a first exclusion frame, the first candidate area not including the first exclusion frame, and the first exclusion frame being any one of the plurality of exclusion frames;

determine a second candidate area of the first candidate area based on a position of a second exclusion frame, in response to the first candidate area including the second exclusion frame, the second candidate area not including the second exclusion frame, and the second exclusion frame being any one of the plurality of exclusion frames except the first exclusion frame; and take the second candidate area as the candidate area, in response to the second candidate area not including any one of the exclusion frames.

In some embodiments, with reference to FIG. 13, the apparatus also includes:

an area deletion module 1205, configured to delete a first candidate area having a size smaller than a first threshold value from the determined plurality of first candidate areas; and the determination unit for a candidate area 1213, configured to determine the second candidate area of the non-deleted first candidate area based on the position of the second exclusion frame, in response to the non-deleted first candidate area including the second exclusion frame.

In some embodiments, with reference to FIG. 13, the determination module for an object frame 1201 is configured to perform at least one of the following:

performing face recognition on the first image to obtain a face frame in the first image;

performing entity recognition on the first image to obtain an entity frame in the first image;

performing text recognition on the first image to obtain a text frame in the first image; and performing watermark recognition on the first image to obtain a watermark frame in the first image.

In some embodiments, with reference to FIG. 13, the determination module for a target frame and an exclusion frame 1202 is configured to perform at least one of the following:

determining a face frame in which a face is located as the first target frame; and determining an entity frame in which an entity is located as the first target frame.

In some embodiments, with reference to FIG. 13, the determination module for a target frame and an exclusion frame 1202 is configured to perform at least one of the following:

determining a text frame in which a text is located as the exclusion frame; and determining a watermark frame in which a watermark is located as the exclusion frame.

In some embodiments, with reference to FIG. 13, the apparatus also includes:

an increasing module 1206, configured to increase a size of each of the first target frames by a first multiple to obtain a plurality of second target frames, when a plurality of first target frames are determined;

a merging module 1207, configured to merge the second target frame with other second target frames into a third target frame, when the second target frame intersects with other second target frames for each of the second target frames; and the determination module for a target area 1203, including:

a first determination unit 1233, configured to determine an area including the third target frame and not including the exclusion frame as the target area in the first image; and a second determination unit 1243, configured to determine an area including a first target frame corresponding to a remaining second target frame and not including the exclusion frame as the target area in the first image, the remaining second target frame being a second target frame skipping merging.

In some embodiments, with reference to FIG. 13, the number of the first target frames is multiple, and the determination module for a target area 1203 includes:

a third determination unit 1253, configured to determine the target area including at least one of the first target frames and not including the exclusion frame in the first image.

In some embodiments, with reference to FIG. 13, the number of the first target frames is multiple, and the determination module for a target area 1203 includes:

a fourth determination unit 1263, configured to determine the target area including a face frame and not including the exclusion frame in the first image, when a plurality of first target frames include the face frame.

In some embodiments, with reference to FIG. 13, the cutting module 1204 includes:

a cutting unit 1214, configured to cut the first image based on the target area to obtain the second image including the first target frame, not including the exclusion frame, and having a target aspect ratio.

In some embodiments, with reference to FIG. 13, the cutting unit 1214 is configured to:

increase at least one of a width or a height of the first target frame to obtain a fourth target frame such that an aspect ratio of the fourth target frame is the target aspect ratio;

keep a central point of the fourth target frame unchanged and increase a size of the fourth target frame until the size is increased by a second multiple or any edge line of the increased fourth target frame overlaps with an edge line of the target area to obtain a fifth target frame; and cut the fifth target frame from the first image and determine the cut fifth target frame as the second image.

In some embodiments, with reference to FIG. 13, the apparatus also includes:

an image acquisition module 1208, configured to acquire the first image in response to a cover setting request for a first video, the first image being used for presenting a content of the first video; and a cover determination module 1209, configured to determine the second image as a cover of the first video, or adjust the second image to a target size and determine the adjusted second image as the cover of the first video.

In some embodiments, with reference to FIG. 13, the cover determination module 1209 includes:

an area segmentation unit 1219, configured to segment the second image into a plurality of image areas;

a determination unit for a difference parameter 1229, configured to determine difference parameters between a brightness of a plurality of pixel points in the image area for each of the image areas;

a number determination unit 1239, configured to determine the number of the difference parameters not smaller than a second threshold value based on the difference parameters separately corresponding to the plurality of image areas; and a cover determination unit 1249, configured to determine the second image as the cover of the first video, or adjust the second image to the target size and determine the adjusted second image as the cover of the first video, when the number is greater than a third threshold value.

In some embodiments, with reference to FIG. 13, the image acquisition module 1208 includes:

an associated image acquisition unit 1218, configured to acquire a plurality of associated images corresponding to the first video, in response to the cover setting request, the associated images being used for presenting the content of the first video;

a definition recognition unit 1228, configured to perform definition recognition on the plurality of associated images to obtain a definition of each of the associated images; and an image determination unit 1238, configured to determine an image having a definition greater than a fourth threshold value as the first image in the plurality of associated images.

In some embodiments, with reference to FIG. 13, the associated image acquisition unit 1218 is configured to:

acquire an alternative cover and a video identification carried in the cover setting request, in response to the cover setting request, the video identification indicating the first video;

acquire at least one video frame corresponding to the video identification in a video frame database; and determine the alternative cover and the at least one video frame as the associated images corresponding to the first video.

The image cutting apparatus provided in the above embodiments only exemplifies the division of the above functional modules when cutting an image. In the actual application, the above functional distribution can be completed by different functional modules based on the needs. That is, the internal structure of the computer device is divided into different functional modules so as to complete all or part of the functions described above. In addition, the image cutting apparatus provided in the above embodiments belongs to the same concept as the embodiments of the image cutting method, and the detailed implementation process thereof is described in detail in the method embodiments, which will not be described in detail herein.

The embodiments of this application also provide a computer device, including a processor and a memory, the memory being configured to store at least one computer program therein, and the at least one computer program being loaded and executed by the processor to cause the computer device to implement operations performed by the image cutting method in the above embodiments.

Figures 14, 15:
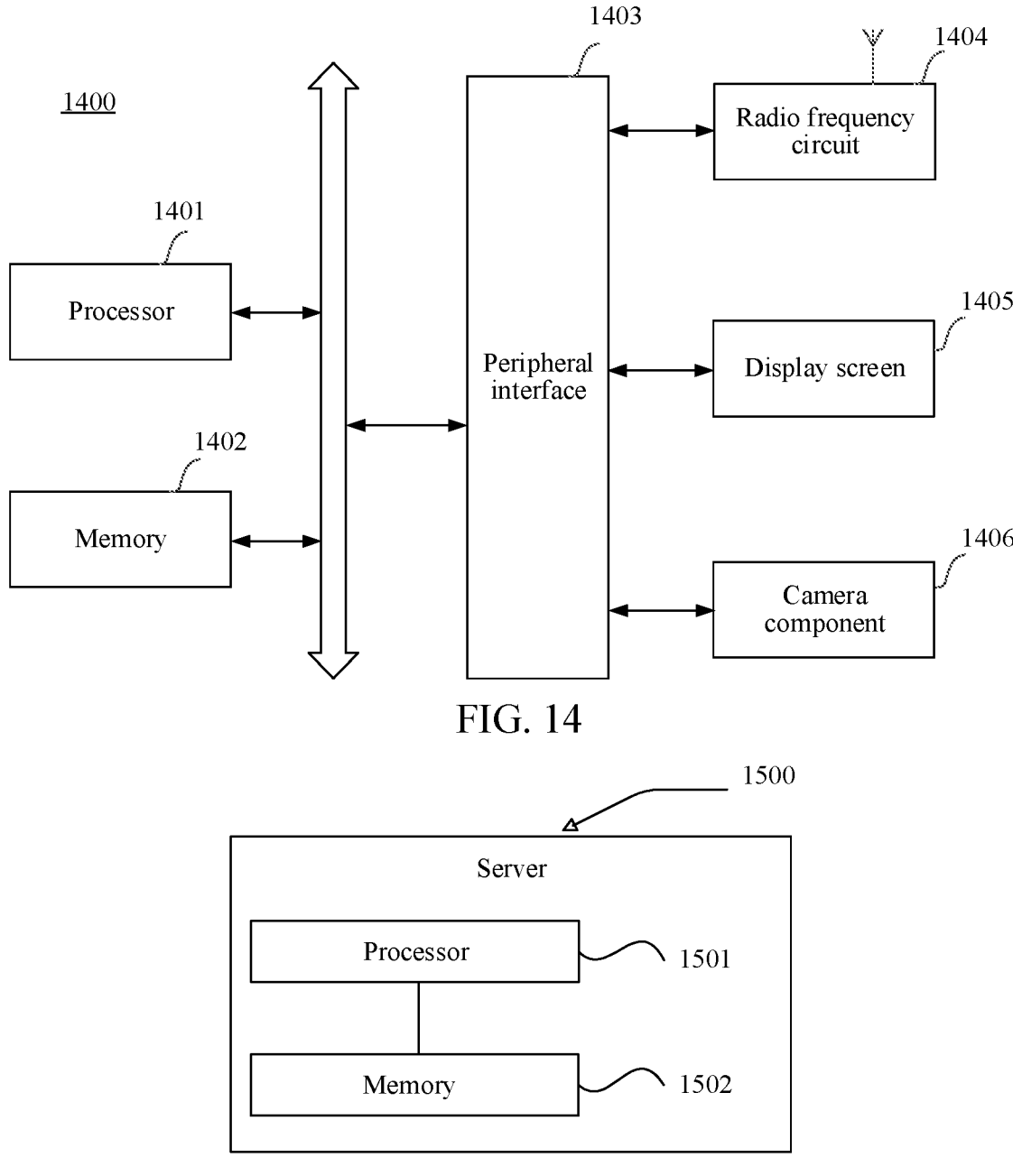
FIG. 14 is a schematic structural diagram of a terminal provided in an embodiment of this application.
FIG. 15 is a schematic structural diagram of a server provided in an embodiment of this application.

In some embodiments, the computer device is provided as a terminal. For example, the terminal is a smart phone, a tablet computer, a notebook computer, a desktop computer, a smart speaker, a smart watch, a smart television, a smart car terminal, and the like. FIG. 14 shows a schematic structural diagram of a terminal 1400 provided in an exemplary embodiment of this application.

The terminal 1400 includes: a processor 1401 and a memory 1402.

The processor 1401 may include one or more processing cores, for example, a 4-core processor or an 8-core processor. The processor 1401 may be implemented in at least one hardware form of the Digital Signal Processing (DSP), Field Programmable Gate Array (FPGA), and Programmable Logic Array (PLA). The processor 1401 may also include a main processor and a co-processor. The main processor, also referred to as the Central Processing Unit (CPU), is a processor configured to process data in a wake-up state. A co-processor is a low-power processor configured to process data in a standby state. In some embodiments, the processor 1401 may be integrated with a Graphics Processing Unit (GPU). The GPU is configured to be responsible for rendering and drawing the content that the display screen needs to present. In some embodiments, the processor 1401 may further include an artificial intelligence (AI) processor. The AI processor is configured to process computing operations related to machine learning.

The memory 1402 may include one or more computer-readable storage media. The computer-readable storage medium may be non-transient. The memory 1402 may further include a high-speed random access memory and a non-transitory memory, for example, one or more disk storage devices or flash storage devices. In some embodiments, a non-transitory computer-readable storage medium in the memory 1402 is configured to store at least one computer program. The at least one computer program is configured to be processed by processor 1401 to implement the image cutting method provided in the method embodiments in this application.

In some embodiments, the terminal 1400 may also include: a peripheral interface 1403 and at least one peripheral. The processor 1401, the memory 1402, and the peripheral interface 1403 may be connected by a bus or signal line. Each peripheral may be connected to the peripheral interface 1403 by a bus, signal line, or circuit board. In some embodiments, the peripheral includes: at least one of a radio frequency (RF) circuit 1404, a display screen 1405, and a camera component 1406.

The peripheral interface 1403 may be configured to connect the at least one peripheral related to input/output (I/O) to the processor 1401 and the memory 1402. In some embodiments, the processor 1401, the memory 1402, and the peripheral interface 1403 are integrated on the same chip or circuit board. In some other embodiments, any one or two of the processor 1401, the memory 1402, and the peripheral interface 1403 may be implemented on a separate chip or circuit board, which is not limited in the embodiments of this application.

The RF circuit 1404 is configured to receive and transmit an RF signal, also referred to as an electromagnetic signal. The RF circuit 1404 communicates with a communication network and other communication devices through the electromagnetic signal. The RF circuit 1404 converts an electrical signal into an electromagnetic signal for transmission, or converts a received electromagnetic signal into an electrical signal. In some embodiments, the RF circuit 1404 includes: an antenna system, an RF transceiver, one or more amplifiers, a tuner, an oscillator, a digital signal processor, a codec chipset, and a subscriber identity module card. The RF circuit 1404 may communicate with another device by at least one wireless communication protocol. The wireless communication protocol includes, but is not limited to: metropolitan area networks, generations of mobile communication networks (2G, 3G, 4G, and 5G), wireless local area networks, and/or Wireless Fidelity (WiFi) networks. In some embodiments, the RF 1404 may further include a circuit related to Near Field Communication (NFC), which is not limited in this application.

The display screen 1405 is configured to display a user interface (UI). The UI may include a graph, text, an icon, a video, and any combination thereof. When the display screen 1405 is a touch display screen, the display screen 1405 also has the ability to collect the touch signal at or above the surface of the display screen 1405. The touch signal may be inputted to the processor 1401 as a control signal for processing. At this point, the display screen 1405 may also be configured to provide virtual buttons and/or virtual keyboards, also referred to as soft buttons and/or soft keyboards. In some embodiments, there is one display screen 1405, and it is arranged on the front panel of the terminal 1400. In some other embodiments, there are at least two display screens 1405, and they are separately arranged on different surfaces of the terminal 1400 or in a folded design. In some other embodiments, the display screen 1405 may be a flexible display screen disposed on a curved or folded surface of the terminal 1400. Even, the display screen 1405 may be further set in a non-rectangular irregular pattern, namely, a special-shaped screen. The display screen 1405 can be made of materials such as Liquid Crystal Display (LCD) and Organic Light-Emitting Diode (OLED).

The camera component 1406 is configured to capture images or videos. In some embodiments, the camera component 1406 includes a front camera and a rear camera. The front camera is provided on the front panel of the terminal 1400, and the rear camera is provided on the back of the terminal 1400. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 1406 may further include a flash. The flash may be a monochrome temperature flash, or may be a double color temperature flash. The double color temperature flash refers to a combination of a warm light flash and a cold light flash, and may be used for light compensation under different color temperatures.

It will be understood by those skilled in the art that the structures shown in FIG. 14 are not limiting the terminal 1400 and may include more or fewer components than the illustration, or some components may be combined, or a different arrangement of components may be employed.

In some embodiments, the computer device is provided as a server. FIG. 15 is a schematic structural diagram of a server provided in an embodiment of this application. The server 1500 can generate relatively large differences due to different configurations or performances, and it may include one or more Central Processing Units (CPU) 1501 and one or more memory 1502. The memory 1502 stores at least one computer program therein, and the at least one computer program is loaded and executed by the processor 1501 to implement the image cutting method provided in the above method embodiments. The server may also have components, such as a wired or wireless network interface, a keyboard, and an I/O interface, so as to perform input and output. The server may also include other components configured to implement the functions of the device, which will not be described in detail herein.

The embodiments of this application also provide a non-transitory computer-readable storage medium, configured to store at least one computer program therein, the at least one computer program being loaded and executed by a processor to cause a computer to implement operations performed by the image cutting method in the above embodiments.

The embodiments of this application also provide a computer program product or a computer program, including a computer program code stored in a non-transitory computer-readable storage medium, the computer program code being read by a processor of a computer device from the non-transitory computer-readable storage medium, and the processor executing the computer program code to cause the computer device to implement operations performed by the image cutting method in the above embodiments. In some embodiments, the computer program involved in the embodiments of this application may be deployed on one computer device, or on a plurality of computer devices located at one site, or on a plurality of computer devices distributed at a plurality of sites and interconnected by a communication network to be executed. The plurality of computer devices distributed at the plurality of sites and interconnected by the communication network may form a block chain system.

It will be appreciated by those skilled in the art that all or part of the steps for implementing the above embodiments may be performed by hardware or may be performed by indicating the related hardware by the program. The program may be stored in a non-transitory computer-readable storage medium. The above storage medium may be a read-only memory, magnetic disc, or compact disc.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The above descriptions are merely the alternative embodiments of the present invention and are not intended to limit the embodiments of the present invention. Any modifications, equivalents, improvements, and the like within the principles of the embodiments of the present invention are to be included in the scope of the present invention.

What is claimed is:

1. An image cutting method performed by a computer device, the method comprising:
    acquiring a first image from a video in response to a cover setting request from a terminal;
    determining an object frame in which an object in the first image belonging to a first type is located as a first target frame and determining an object frame in which an object in the first image belonging to a second type is located as an exclusion frame;
    establishing a spatial coordinate system corresponding to positional coordinates of the first image;
    determining coordinate information of the exclusion frame and the first target frame in the spatial coordinate system;
    determining coordinate information of a plurality of candidate areas in the first image based on the coordinate information of the exclusion frame;
    determining a target area in the first image, the target area comprising the first target frame and not comprising the exclusion frame;
    cutting the first image based on the target area to obtain a second image comprising the first target frame and not comprising the exclusion frame; and
    adjusting the second image to a target size and transmitting the second image to the terminal as the cover of the video.

2. The method according to claim 1, wherein the determining a target area in the first image comprises:
    determining a smallest one of the plurality of candidate areas as the target area comprising the first target frame.

3. The method according to claim 1, wherein the determining an object frame in which an object in a first image belonging to a first type is located as a first target frame comprises at least one of the following:
    determining a face frame in which a face is located as the first target frame; and
    determining an entity frame in which an entity is located as the first target frame.

4. The method according to claim 1, wherein the determining an object frame in which an object in the first image belonging to a second type is located as an exclusion frame comprises at least one of the following:
    determining a text frame in which a text is located as the exclusion frame; and determining a watermark frame in which a watermark is located as the exclusion frame.

5. The method according to claim 1, wherein the number of the first target frames is multiple, and the determining a target area in the first image comprises:
    determining the target area comprising at least one of the first target frames and not comprising the exclusion frame in the first image.

6. The method according to claim 1, wherein the number of the first target frames is multiple, and the determining a target area in the first image comprises:
    determining the target area comprising a face frame and not comprising the exclusion frame in the first image, when a plurality of first target frames comprise the face frame.

7. The method according to claim 1, wherein the cutting the first image based on the target area to obtain a second image comprising the first target frame and not comprising the exclusion frame comprises:
    cutting the first image based on the target area to obtain the second image comprising the first target frame, not comprising the exclusion frame, and having a target aspect ratio.

8. The method according to claim 1, wherein the adjusting the second image to a target size and determining the adjusted second image as the cover of the first video comprises:
    segmenting the second image into a plurality of image areas;
    determining difference parameters between a brightness of a plurality of pixel points in the image area for each of the image areas;
    determining the number of the difference parameters not smaller than a second threshold value based on the difference parameters separately corresponding to the plurality of image areas; and
    adjusting the second image to the target size and determining the adjusted second image as the cover of the first video, when the number is greater than a third threshold value.

9. A computer device, comprising a processor and a memory, the memory being configured to store at least one computer program therein, and the at least one computer program being loaded and executed by the processor to cause the computer device to implement an image cutting method including:
    acquiring a first image from a video in response to a cover setting request from a terminal;
    determining an object frame in which an object in the first image belonging to a first type is located as a first target frame and determining an object frame in which an object in the first image belonging to a second type is located as an exclusion frame;
    establishing a spatial coordinate system corresponding to positional coordinates of the first image;
    determining coordinate information of the exclusion frame and the first target frame in the spatial coordinate system;
    determining coordinate information of a plurality of candidate areas in the first image based on the coordinate information of the exclusion frame;
    determining a target area in the first image, the target area comprising the first target frame and not comprising the exclusion frame;
    cutting the first image based on the target area to obtain a second image comprising the first target frame and not comprising the exclusion frame; and adjusting the second image to a target size and transmitting the second image to the terminal as the cover of the video.

10. The computer device according to claim 9, wherein the determining a target area in the first image comprises:

determining a smallest one of the plurality of candidate areas as the target area comprising the first target frame.

11. The computer device according to claim 9, wherein the determining an object frame in which an object in a first image belonging to a first type is located as a first target frame comprises at least one of the following:

determining a face frame in which a face is located as the first target frame; and determining an entity frame in which an entity is located as the first target frame.

12. The computer device according to claim 9, wherein the determining an object frame in which an object in the first image belonging to a second type is located as an exclusion frame comprises at least one of the following:

determining a text frame in which a text is located as the exclusion frame; and determining a watermark frame in which a watermark is located as the exclusion frame.

13. The computer device according to claim 9, wherein the number of the first target frames is multiple, and the determining a target area in the first image comprises:

determining the target area comprising at least one of the first target frames and not comprising the exclusion frame in the first image.

14. The computer device according to claim 9, wherein the number of the first target frames is multiple, and the determining a target area in the first image comprises:

determining the target area comprising a face frame and not comprising the exclusion frame in the first image, when a plurality of first target frames comprise the face frame.

15. The computer device according to claim 9, wherein the cutting the first image based on the target area to obtain a second image comprising the first target frame and not comprising the exclusion frame comprises:

cutting the first image based on the target area to obtain the second image comprising the first target frame, not comprising the exclusion frame, and having a target aspect ratio.

16. The computer device according to claim 9, wherein the adjusting the second image to a target size and determining the adjusted second image as the cover of the first video comprises:

segmenting the second image into a plurality of image areas;

determining difference parameters between a brightness of a plurality of pixel points in the image area for each of the image areas;

determining the number of the difference parameters not smaller than a second threshold value based on the difference parameters separately corresponding to the plurality of image areas; and adjusting the second image to the target size and determining the adjusted second image as the cover of the first video, when the number is greater than a third threshold value.

17. A non-transitory computer-readable storage medium, configured to store at least one computer program therein, the at least one computer program being loaded and executed by a processor of a computer device to cause the computer device to implement an image cutting method including:

acquiring a first image from a video in response to a cover setting request from a terminal;

determining an object frame in which an object in the first image belonging to a first type is located as a first target frame and determining an object frame in which an object in the first image belonging to a second type is located as an exclusion frame;

establishing a spatial coordinate system corresponding to positional coordinates of the first image;

determining coordinate information of the exclusion frame and the first target frame in the spatial coordinate system;

determining coordinate information of a plurality of candidate areas in the first image based on the coordinate information of the exclusion frame;

determining a target area in the first image, the target area comprising the first target frame and not comprising the exclusion frame;

cutting the first image based on the target area to obtain a second image comprising the first target frame and not comprising the exclusion frame; and adjusting the second image to a target size and transmitting the second image to the terminal as the cover of the video.

* * * * *